United States Patent
Song et al.

(10) Patent No.: US 10,027,539 B2
(45) Date of Patent: Jul. 17, 2018

(54) RADIO NODE, WIRELESS DEVICE, AND METHODS THEREIN FOR CONFIGURING THE WIRELESS DEVICE

(71) Applicant: Telefonaktiebolaget LM Ericsson (publ), Stockholm (SE)

(72) Inventors: Xinghua Song, Beijing (CN); Shaohua Li, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 191 days.

(21) Appl. No.: 14/914,028

(22) PCT Filed: Jan. 12, 2016

(86) PCT No.: PCT/EP2016/050430
§ 371 (c)(1),
(2) Date: Feb. 24, 2016

(87) PCT Pub. No.: WO2016/116324
PCT Pub. Date: Jul. 28, 2016

(65) Prior Publication Data
US 2016/0359663 A1  Dec. 8, 2016

(30) Foreign Application Priority Data
Jan. 23, 2015 (WO) ................ PCT/CN2015/071432

(51) Int. Cl.
| | |
|---|---|
| *H04L 12/24* | (2006.01) |
| *H04L 5/00* | (2006.01) |
| *H04L 1/18* | (2006.01) |
| *H04L 5/14* | (2006.01) |
| *H04W 72/04* | (2009.01) |
| *H04W 72/12* | (2009.01) |
| *H04W 80/06* | (2009.01) |
| *H04W 88/02* | (2009.01) |

(52) U.S. Cl.
CPC ........ *H04L 41/0806* (2013.01); *H04L 1/1812* (2013.01); *H04L 5/001* (2013.01);
(Continued)

(58) Field of Classification Search
CPC ... H04L 1/1812; H04L 41/0806; H04L 5/001; H04L 5/003; H04L 5/0053; H04L 5/14;
(Continued)

(56) References Cited

U.S. PATENT DOCUMENTS

| | | | |
|---|---|---|---|
| 9,148,884 B2 * | 9/2015 | Aiba ................. | H04L 5/001 |
| 2010/0098012 A1 * | 4/2010 | Bala ................. | H04L 5/001 |
| | | | 370/329 |

(Continued)

FOREIGN PATENT DOCUMENTS

WO    2012118356 A2    9/2012

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 11)", Technical Specification, 3GPP TS 36.211 V11.1.0, Dec. 1, 2012, pp. 1-108, 3GPP, France.
(Continued)

*Primary Examiner* — Robert Lopata
(74) *Attorney, Agent, or Firm* — Coats & Bennett, PLLC

(57) ABSTRACT

Method in a radio node (101) for configuring a wireless device (120). The radio node (101) and the wireless device (120) operate in a wireless communications network (100). The radio node (101) configures the wireless device (120) with a plurality of Physical Uplink Control Channel, PUCCH, resource units. The plurality of PUCCH resource units is associated with a number of downlink, DL, aggregated carriers.

56 Claims, 8 Drawing Sheets

(52) U.S. Cl.
CPC ............ *H04L 5/003* (2013.01); *H04L 5/0053* (2013.01); *H04L 5/0055* (2013.01); *H04L 5/14* (2013.01); *H04W 72/0413* (2013.01); *H04W 72/1284* (2013.01); *H04W 72/1289* (2013.01); *H04W 80/06* (2013.01); *H04W 88/02* (2013.01)

(58) Field of Classification Search
CPC ....... H04L 41/04; H04L 41/085; H04L 41/12; H04L 45/02; H04W 72/0413; H04W 72/1284; H04W 72/1289; H04W 80/06; H04W 88/02; H04W 84/18
USPC ........................................................ 370/254
See application file for complete search history.

(56) References Cited

U.S. PATENT DOCUMENTS

| | | | |
|---|---|---|---|
| 2013/0034073 A1* | 2/2013 | Aiba ..................... | H04L 1/0026 370/329 |
| 2013/0083742 A1 | 4/2013 | Baldemair et al. | |
| 2013/0136084 A1* | 5/2013 | Zhang ................ | H04W 72/0413 370/329 |
| 2013/0208665 A1* | 8/2013 | Baldemair ............ | H04L 1/0031 370/329 |
| 2013/0242813 A1* | 9/2013 | Wang ...................... | H04L 5/001 370/280 |
| 2013/0301571 A1 | 11/2013 | Sorrentino et al. | |
| 2015/0117272 A1* | 4/2015 | Gao ....................... | H04L 1/1861 370/280 |
| 2015/0358127 A1* | 12/2015 | Seo ....................... | H04L 1/1861 370/329 |
| 2015/0358927 A1* | 12/2015 | Gao .................... | H04W 52/365 370/329 |
| 2016/0212649 A1* | 7/2016 | Chen ..................... | H04W 24/10 |

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11.1.0, Dec. 1, 2012, pp. 1-160, 3GPP, France.

* cited by examiner

US 10,027,539 B2

RADIO NODE, WIRELESS DEVICE, AND METHODS THEREIN FOR CONFIGURING THE WIRELESS DEVICE

TECHNICAL FIELD

The present disclosure relates generally to a radio node, and methods therein for configuring a wireless device. The present disclosure also relates to the wireless device, and methods therein for receiving a configuration from the radio node. The present disclosure relates as well to computer programs and computer-readable storage mediums, having stored thereon the computer programs to carry out the aforementioned methods.

BACKGROUND

Communication devices such as wireless devices are also known as e.g. User Equipments (UE), mobile terminals, wireless terminals and/or mobile stations. Wireless devices are enabled to communicate wirelessly in a communications network or wireless communication system, sometimes also referred to as a radio system or networks. The communication may be performed e.g. between two wireless devices, between a wireless device and a regular telephone and/or between a wireless device and a server via a Radio Access Network (RAN) and possibly one or more core networks, comprised within the communications network.

Wireless devices may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The communications network may cover a geographical area which may be divided into cell areas, wherein each cell area may be served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Communications such as transmissions in radio communication systems may be often organized in terms of frames, or sometimes subframes, e.g. in LTE, where each frame is a group of communication resources, e.g., radio time and frequency resources, that may comprise both, a control field and a payload data field, or multiple fields of the respective types. A field may be understood herein to refer to a set of time and frequency resources, also referred to herein as time-frequency resources. The time-frequency resources corresponding to a field may be contiguous in the time and frequency dimensions. The control field may, e.g., comprise information about how the data part of the frame is encoded and modulated. The control field may also be used for receiving feedback information in the reverse link direction, i.e., from the receiver of the data, e.g., for receiving ACKnowledgement/Negative ACKnowledgement (ACK/NACK) or channel state information reports.

Fields may be in most transmission systems further divided into smaller units, e.g., in Orthogonal Frequency-Division Multiplexing (OFDM) systems, the fields may be further divided into one or more OFDM symbols. Something similar holds for many other types of systems than OFDM, e.g., for many systems based on multi-carrier transmission or pre-coded multi-carrier transmission, such as Filter-Bank Multi-Carrier (FBMC), Discrete Fourier Transform (DFT)-spread OFDM, etc. As a general term, such smaller units may be referred to herein as symbols. Some fields may consist of only a single symbol.

LTE may use OFDM in the DL and DFT-spread OFDM in the UL. The basic LTE DL physical resource may thus be seen as a time-frequency grid as illustrated in FIG. 1, where each resource element corresponds to one OFDM subcarrier during one OFDM symbol interval.

In the time domain, LTE DL transmissions may be organized into radio frames of 10 milliseconds (ms), each radio frame consisting of ten equally-sized subframes of length Tsubframe=1 ms. FIG. 2 is a schematic illustration of the LTE time-domain structure.

The resource allocation in LTE may be typically described in terms of resource blocks, where a resource block corresponds to one slot, 0.5 ms, in the time domain and 12 contiguous subcarriers in the frequency domain. A pair of two adjacent resource blocks in time direction, 1.0 ms, is known as a resource block pair. Resource blocks may be numbered in the frequency domain, starting with 0 from one end of the system bandwidth.

Carrier Aggregation

The use of LTE Carrier Aggregation (CA), introduced in Rel-10 and enhanced in Rel-11, may offer means to increase the peak data rates, system capacity and user experience by aggregating radio resources from multiple carriers that may reside in the same band or different bands and, for the case of inter-band Time-Division Duplex (TDD) CA, the carriers may be configured with different UL/DL configurations. In Rel-12, CA between TDD and Frequency-Division Duplex (FDD) serving cells was introduced to support UE connecting to them simultaneously. Up to this release, the maximum number of carriers which are supported is 5.

In Rel-13, Licensed-Assisted Access (LAA) has attracted a lot of interest in extending the LTE CA feature towards capturing the spectrum opportunities of unlicensed spectrum in the 5 GHz band. WLAN operating in the 5 GHz band nowadays may already support 80 Mega Hertz (MHz) in the field, and 160 MHz is to follow in Wave 2 deployment of IEEE 802.11ac. There are also other frequency bands, such as 3.5 Giga Hertz (GHz), where aggregation of more than one carrier on the same band may be possible, in addition to the bands already widely in use for LTE. Enabling the utilization of at least similar bandwidths for LTE in combination with LAA, as IEEE 802.11ac Wave 2, may support calls for extending the carrier aggregation framework to support more than 5 carriers. The extension of the CA framework beyond 5 carriers was approved to be one work item for LTE Rel-13. The objective is to support up to 32 carriers in both UL and DL.

A UE may typically report feedback to the serving network node on the quality of the carrier that carries information that may be exchanged between the serving network node and the UE. This may be done so the network node may for example adjust some transmission parameters, to improve the quality or efficiency of the communication between the network node and the UE. Compared to single-carrier operation, a UE operating with CA may have to report feedback for more than one DL component carrier. However, a UE may not need to support DL and UL CA simultaneously. For instance, the first release of CA capable UEs in the market may only support DL CA, but not UL CA. This is also the underlying assumption in the 3GPP RAN4 standardization. Hence, support of DL CA may lead to feedback for multiple DL carriers being carried in one single UL carrier. The capacity of UL control channel for single carrier operation cannot meet the new capacity requirements. Therefore, to address this problem, an enhanced UL control channel, i.e. Physical Uplink Control CHannel (PUCCH) format 3, was introduced in the first release of CA. Such an UL control channel may carry the feedback information from the UE, and is further described in the next section. However, in order to support more component carriers in Rel-13, the UL control channel capacity becomes a limitation. More specifically, Rel-10 PUCCH format 3 supports up to 10-bit Hybrid Automatic Repeat reQuest ACK (HARQ-ACK) for FDD and 20-bit for TDD, but a UE configured with 32 DL Component Carriers (CCs) may need up to 64 bits HARQ-ACK for FDD, and even more for TDD. Generally, one HARQ-ACK bit may be needed for one DL transport block. In LTE, at most two transport blocks may be supported for allocation to a single UE during a subframe in one serving cell, which corresponds to 2 HARQ-ACK bits.

PUCCH Format 3

To support the transmission of DL and UL transport channels, there may be a need for UL L1/L2 control signaling. UL L1/L2 control signaling may carry control information and may comprise: HARQ acknowledgements for acknowledging whether the received Physical Downlink Shared CHannel (PDSCH) transport blocks have been correctly received or not, or whether they have been missed, channel-state reports related to the DL channel conditions, such as Channel State Information (CSI), used to assist DL scheduling, and scheduling requests, indicating that a terminal needs UL resources for UL-SCH transmissions.

In LTE, three PUCCH formats with different sizes may be defined which may support the transmission of the above-described UL L1/L2 control signaling for different purposes.

In LTE PUCCH format 1/1a/1b and PUCCH format 2/2a/2b may be supported for Scheduling Request (SR), HARQ-ACK and periodic Channel State Information (CSI) reporting. A PUCCH resource may be understood as a physical resource unit which may be used to convey L1/L2 control signaling. Physically, a PUCCH resource may correspond to one or several physical resource blocks together with some other transmit parameters such as cyclic shift, orthogonal cover code, spreading code, etc . . . . The PUCCH resource may be represented by a single scalar index, that is, a number, from which parameters, e.g., transmission parameters, such as the phase rotation and/or the orthogonal cover sequence, may be derived, based on PUCCH format. The use of a phase rotation of a cell-specific sequence together with orthogonal sequences may provide orthogonality between different terminals in the same cell transmitting PUCCH on the same set of resource blocks. In LTE Rel-10, PUCCH format 3 was introduced for carrier aggregation and TDD, when there are multiple DL transmissions, either on multiple carriers or multiple DL subframes, but single UL, either single carrier or single UL subframe, for HARQ-ACK, SR and CSI feedback.

Similarly to PUCCH format 1/1a/1b and PUCCH format 2/2a/2b, the PUCCH format 3 resource may be also represented by a single scalar index, e.g., an integer ranging from 0 to 549, from which the orthogonal cover sequence and the resource-block number may be derived. Physically, a PUCCH format 3 resource may correspond to one physical resource block together with some other transmit parameters such as cyclic shift, orthogonal cover code, spreading code, etc . . . . A length-5 orthogonal sequence may be applied for PUCCH format 3 to support code multiplexing within one resource-block pair, according to 3GPP TS 36.211, and a length-4 orthogonal cover may be applied for a shorted PUCCH, wherein one OFDM symbol is punctured for SRS transmission in the second slot. If the PUCCH format 3 resource is denoted as $n_{PUCCH}^{(3)}$, the resource block number, that is an identifier for each resource block, of the PUCCH format 3 resource m may be determined by the following:

$$m = \lfloor n_{PUCCH}^{(3)} / N_{SF,0}^{PUCCH} \rfloor$$

The orthogonal cover sequence applied for the two slots corresponding to the resource-block pair may be derived by the following:

$$n_{oc,0} = n_{PUCCH}^{(3)} \bmod N_{SF,1}^{PUCCH}$$

$$n_{oc,1} = \begin{cases} (3n_{oc,0}) \bmod N_{SF,1}^{PUCCH} & \text{if } N_{SF,1}^{PUCCH} = 5 \\ n_{oc,0} \bmod N_{SF,1}^{PUCCH} & \text{otherwise} \end{cases}$$

Where $N_{SF,0}^{PUCCH}$ and $N_{SF,1}^{PUCCH}$ are the length of the orthogonal cover sequence for the two slots respectively. The PUCCH format 3 resource may be determined according to higher layer configuration and a dynamic indication from the downlink assignment. In detail, the Transmitter Power Control (TPC) field in the Downlink Control Information (DCI) format of the corresponding Physical Downlink Control CHannel (PDCCH)/Enhanced PDCCH (EPDCCH) may be used by a network node such as an eNB to determine the PUCCH resource values from one of four resource values configured by higher layers, with the mapping defined in Table 1, according to 3GPP TS 36.213. According to Table 1, four candidate resources may be configured at a network node by the higher layers. For each PUCCH transmission, one resource may be selected from the four candidate resources and indicated to a wireless devices via the TPC field. Each of these resource values is the scalar index. For FDD, the TPC field may correspond to the PDCCH/EPDCCH for the scheduled secondary serving cells. For TDD, the TPC field may correspond to the PDCCH/EPDCCH for the primary cell with Downlink Assignment Index (DAI) value in the PDCCH/EPDCCH larger than '1'. For a given UE, several PDCCH assignments may be sent to the UE in order to schedule PDSCH transmissions on more than one serving cell, with e.g. one-to-one mapping between PDCCH assignment and PDSCH transmission. Based on PUCCH format 3 capacity and the maximum configurable DL carriers number, only one PUCCH format 3 may be needed to be configured in Rel-12. According to current specification requirements, a UE may assume that the same PUCCH resource values are transmitted in each DCI format of the corresponding PDCCH/EPDCCH assignments that may be used to determine the PUCCH for this UE in the subframe. With the duplicate transmission of the same PUCCH resource values, the UE avoid the PUCCH resource ambiguity in case some of DCI are missing.

TABLE 1

PUCCH Resource Value for HARQ-ACK Resource for PUCCH

| Value of 'TPC command for PUCCH' or 'HARQ-ACK resource offset' | $n_{PUCCH}^{(3,\tilde{p})}$ |
|---|---|
| '00' | The 1st PUCCH resource value configured by the higher layers |
| '01' | The 2$^{nd}$ PUCCH resource value configured by the higher layers |
| '10' | The 3$^{rd}$ PUCCH resource value configured by the higher layers |
| '11' | The 4$^{th}$ PUCCH resource value configured by the higher layers |

According to the foregoing, existing PUCCH formats do not support the current demands for CA since their capacity is not sufficient to enable UEs to send the necessary amount of bits of information in the UL, e.g., for HARQ signaling which may be associated with the increase in the number of DL carriers. As indicated above in regards to carrier aggregation, the 3GPP Release 13 aims to support up to 32 CCs in both UL and DL. For this purpose, the capacity of the PUCCH, which is the channel that may carry the UL feedback information from the UE, may become a limitation. This may be a problem, especially for UEs not supporting DL and UL CA simultaneously, where the UE may have to transmit UL control signaling information corresponding to a large number of DL component carriers on a single UL carrier. For UEs only supporting DL CA, the UL control information may only be transmitted on the primary UL carrier, as it may be done in Rel-10. As an example, if 32 DL CCs are configured for a given UE and two transport blocks are scheduled on each CC, then the UE may need to feedback 64 bits HARQ-ACK in one subframe, which exceeds the maximum capacity of PUCCH format 3, 20 bits for TDD and 10 bits for FDD. If e.g., PUCCH format 3, is still used, when the number of DL component carriers exceed a certain number of carriers, e.g., 10, or 32 DL carriers, a UE has to drop or abandon some UL control information due to the capacity limitation. With the loss of this information, the network node may need to retransmit PDSCH or has no way to adjust the transmission parameters to adapt to the channel condition, thus leading to deterioration of the DL spectrum efficiency.

SUMMARY

It is therefore an object of embodiments herein to improve the performance of a communications network by providing improved methods of performing UL transmission to support carrier aggregation.

According to a first aspect of embodiments herein, the object is achieved by a method in a radio node for configuring a wireless device. The radio node and the wireless device operate in a wireless communications network. The radio node configures the wireless device with a plurality of PUCCH resource units. The plurality of PUCCH resource units is associated with a number of DL aggregated carriers.

According to a second aspect of embodiments herein, the object is achieved by a method in the wireless device for receiving the configuration from the radio node. The radio node and the wireless device operate in the wireless communications network. The wireless device receives the configuration from the radio node with the plurality of PUCCH resource units. The plurality of PUCCH resource units is associated with the number of DL aggregated carriers.

According to a third aspect of embodiments herein, the object is achieved by a radio node configured to configure the wireless device. The radio node and the wireless device are configured to operate in the wireless communications network. The radio node is further configured to configure the wireless device with the plurality of PUCCH resource units. The plurality of PUCCH resource units is associated with the number of DL aggregated carriers.

According to a fourth aspect of embodiments herein, the object is achieved by a wireless device configured to receive the configuration from the radio node. The radio node and the wireless device are configured to operate in the wireless communications network. The wireless device is further configured to receive the configuration from the radio node with the plurality of PUCCH resource units. The plurality of PUCCH resource units is associated with the number of DL aggregated carriers.

According to a fifth aspect of embodiments herein, the object is achieved by a computer program, comprising instructions which, when executed on at least one processor, cause the at least one processor to carry out the method performed by the radio node.

According to a sixth aspect of embodiments herein, the object is achieved by a computer-readable storage medium, having stored thereon the computer program, comprising instructions which, when executed on at least one processor, cause the at least one processor to carry out the method performed by the radio node.

According to a seventh aspect of embodiments herein, the object is achieved by a computer program, comprising instructions which, when executed on at least one processor, cause the at least one processor to carry out the method performed by the wireless device.

According to an eighth aspect of embodiments herein, the object is achieved by a computer-readable storage medium, having stored thereon the computer program, comprising instructions which, when executed on at least one processor, cause the at least one processor to carry out the method performed by the wireless device.

By the radio node configuring the wireless device with a plurality of PUCCH resource units associated with the number of DL aggregated carriers, the capacity of the PUCCH is increased, in a simple way. Hence, UL transmission of control information using carrier aggregation of a large number of carriers, e.g., 32 CC or higher, may be supported. Furthermore, the embodiments herein may be based on the existing PUCCH channel design, and has the advantages of: simple extension to support larger number of DL CCs, low implementation complexity, since existing channel coding structure may be reused, and backward compatibility with existing UEs.

BRIEF DESCRIPTION OF THE DRAWINGS

Examples of embodiments herein are described in more detail with reference to attached drawings in which.

DETAILED DESCRIPTION

Terminologies

Figure 1:
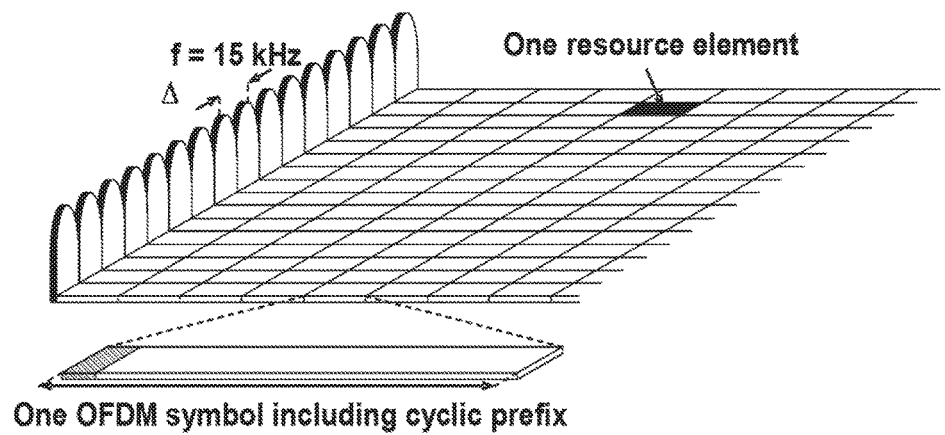
FIG. 1 is a schematic diagram illustrating the LTE DL physical resource.
Figure 2:
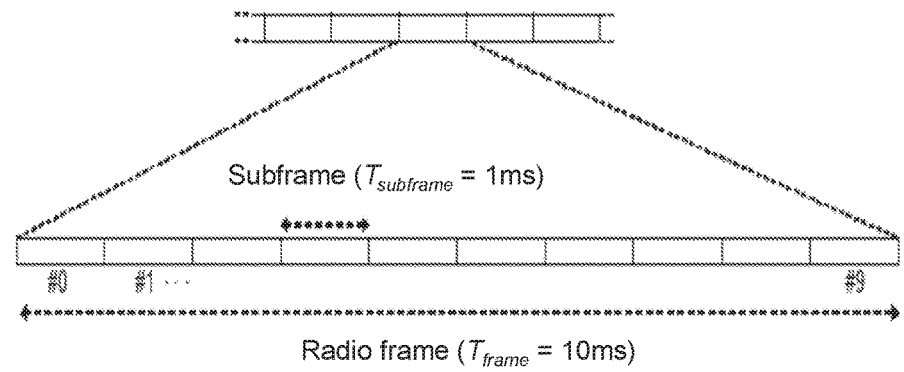
FIG. 2 is a schematic diagram illustrating the LTE time-domain structure.

The following commonly terminologies are used in the embodiments and are elaborated below:

Radio network node: In some embodiments the non-limiting term radio network node is more commonly used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, Remote Radio Unit (RRU), Remote Radio Head (RRH), nodes in distributed antenna system (DAS) etc.

Network node: In some embodiments a more general term "network node" is used and it may correspond to any type of radio network node or any network node, which communicates with at least a radio network node. Examples of network node are any radio network node stated above, core network node, (e.g. Mobile Switching Centre (MSC), Mobility Management Entity (MME) etc), Operation and Maintenance (O&M), Operations Support System (OSS), Self-Optimizing/Organizing Network (SON), positioning node (e.g. Evolved Serving Mobile Location Centre (E-SMLC), Minimization of Drive Test (MDT), etc.

User equipment: In some embodiments the non-limiting term user equipment (UE) is used and it refers to any type of wireless device communicating with a radio network node in a cellular or mobile communication system. Any reference herein to a UE is therefore understood to refer to a wireless device. Examples of UE are target device, device to device UE, machine type UE or UE capable of machine to machine communication, Personal Digital Assistant (PDA), Tablet, mobile terminals, smart phone, laptop embedded equipped (LEE), laptop mounted equipment (LME), Universal Serial Bus (USB) dongles etc.

The embodiments herein also applies to the multi-point carrier aggregation systems.

Note that although terminology from 3GPP LTE has been used in this disclosure to exemplify the embodiments herein, this should not be seen as limiting the scope of the embodiments herein to only the aforementioned system. Other wireless systems, including Wideband Code Division Multiple Access (WCDMA), Worldwide Interoperability for Microwave Access (WiMax), Ultra Mobile Broadband (UMB) and Global System for Mobile communications (GSM), may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Embodiments herein provide several approaches that may enhance the UL control channel capacity on a single uplink component carrier.

Embodiments herein may provide an enhanced UL channel design for transmission of UL control signaling. Different signaling methods are provided from which the physical resources for the enhanced UL channel may be derived. The enhanced UL channel may be used to transmit L1 control signaling including HARQ-ACK, SR and periodic CSI.

Particular embodiments herein may relate to a PUCCH enhancement for LTE. In particular, embodiments herein may relate to an enhanced PUCCH design for LTE carrier aggregation.

The term PUCCH resource may be used herein. A PUCCH resource may be understood as a physical resource unit which may be used to convey L1/L2 (Layer 1/layer 2) control signaling. Physically, it may correspond to one or several physical resource blocks together with some other transmit parameters such as cyclic shift, orthogonal cover code, spreading code, etc . . . , as described in the background section. Thus, any reference herein to a "PUCCH resource" may be understood to refer to a "PUCCH resource unit".

Any reference herein to the PUCCH, PDCCH and E(PDCCH) is understood to be applicable to a channel with similar functional characteristics, although a different name may be used.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Figure 3:
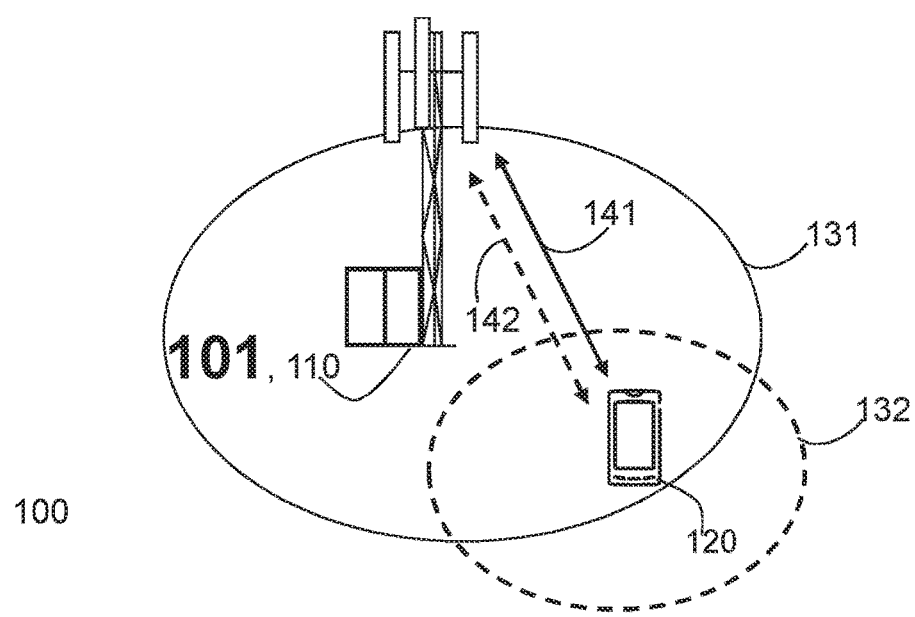
FIG. 3 is a schematic diagram illustrating an example of a wireless communications network, according to some embodiments.

FIG. 3 depicts an example of a wireless communications network 100, sometimes also referred to as a cellular radio system, cellular network or wireless communications system, in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, GSM network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, WiMax, 5G system or any cellular network or system. Thus, although terminology from 3GPP LTE may be used in this disclosure to exemplify embodiments herein, this should not be seen as limiting the scope of the embodiments herein to only the aforementioned system.

The wireless communications network 100 comprises a radio node 101. The radio node 101 may be a radio network node, such as a network node 110 described below. In the non-limiting particular example illustrated in FIG. 3, the radio node 101 is the network node 110.

The network node 110 may be a transmission point such as a radio base station, for example an eNB, an eNodeB, or an Home Node B, an Home eNode B or any other network node capable to serve a wireless device, such as a user equipment or a machine type communication device in a wireless communications network.

The wireless communications network 100 covers a geographical area which is divided into cell areas, wherein each cell area is served by a network node, although, one network node may serve one or several cells. In the non-limiting example depicted in FIG. 3, the network node 110 serves a first cell 131 or primary cell 131. The primary cell 131 is typically in licensed spectrum. The network node 110 also serves a second cell 132, secondary cell 132, e.g., a licensed-assisted access cell 132 in unlicensed spectrum. The primary cell 131 and the secondary cell 132 are used for communication between the network node 110 and wireless device 120. The network node 110 may also serve one or more additional secondary cells, as will be described later. This is however not represented in FIG. 3, to simplify the Figure. The network node 110 may be of different classes, such as, e.g., macro eNodeB, home eNodeB or pico base station, based on transmission power and thereby also cell size. Typically, the wireless communications network 100 may comprise more cells similar to the first cell 131 and the second cell 132, served by their respective network node. This is not depicted in FIG. 3 for the sake of simplicity. The network node 110 may support one or several communication technologies, and its name may depend on the technology and terminology used. In 3GPP LTE, the network node 110, which may be referred to as eNodeBs or even eNBs, may be directly connected to one or more core networks.

The wireless device 120 also referred to herein as a user equipment or UE is located in the wireless communication network 100. The wireless device 120 may e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices.

The radio node 101 is configured to communicate within the wireless communications network 100 with the first wireless device 120 over a first radio link 141 in the primary cell 131, and over a second radio link 142 in the secondary cell 132. While not illustrated in the FIG. 3, the second radio link 142 or one of equivalent characteristics may also be established between the radio node 101 and another radio node.

In the following discussion, any reference to a UE is used as an example of the wireless device 120 and an eNB is used as an example of the radio node 101.

Embodiments of a method performed by the radio node 101, e.g., the network node 110, for configuring the wireless device 120, will now be described with reference to the flowchart depicted in FIG. 4. As stated earlier, the radio node 101 and the wireless device 120 operate in the wireless communications network 100.

The method may comprise the following actions, which actions may as well be carried out in another suitable order than that described below. In some embodiments, the radio node 101 may perform all actions, whereas in other embodiments, some actions may be performed. In some embodiments, the order of the actions illustrated in FIG. 4 may be changed in one or more actions. The optional actions are indicated with dashed blocks. One or more embodiments may be combined, where applicable. All possible combinations are not described to simplify the description.

Action 401

In order to increase the capacity of the PUCCH, and therefore enable UL transmission of control information using carrier aggregation of a large number of carriers in the DL, e.g., 32 CC, in this action, the radio node 101 configures the wireless device 120 with a plurality of PUCCH resource units, wherein the plurality of PUCCH resource units is associated with a number of DL aggregated carriers. In other words, for a number of DL aggregated carriers, the number being larger than one, the radio node 101 configures the wireless device 120 with multiple PUCCH resource units, that is, the radio node 101 allocates multiple PUCCH resource units to the wireless device 120. The DL aggregated carriers may be understood as the aggregated carriers used for transmission from the radio node 101 to the wireless device 120. The number may be understood as being lager than one. In some examples, the number of DL aggregated carriers may be 32. The aggregated carriers may be understood to be aggregated because they may be used to increase the bandwidth for the radio node 101 to serve the wireless device 120.

Associated with may be understood herein as meaning or assigned to in order to carry feedback information on information received on the same DL aggregated carriers.

The configuring may be implemented, for example, by the sending a Radio Resource Control (RRC) message and/or Medium Access Control (MAC) message and/or physical layer signal to the wireless device 120. This may be performed after the radio node 101 obtains information from an indication of a capability of the wireless device 120, or release information regarding the wireless device 120. For example, when the wireless device 120 may claim it is a Rel-13 UE, it may be mandatory to support more DL carriers.

In general, they may be two different ways of configuring multiple PUCCH resources for the wireless device 120, that is different ways of configuring the plurality of PUCCH resource units. In a first possible implementation, Alternative 1, the radio node 101 may configure multiple PUCCH resources groups, where each resource group may represent a plurality of PUCCH resource units. In additional actions, the radio node 101 may then select one resource group out of multiple groups and signal this selection to the wireless device 120, as explained in the actions below. In a second possible implementation, Alternative 2, the radio node 101 may configure multiple PUCCH resource units, which are not grouped. The radio node 101 may, for example, configure different resource units for different carriers so that multiple PUCCH resource units may be configured, as discussed below.

Alternative 1

According to Alternative 1, in some embodiments, each aggregated carrier in the number of DL aggregated carriers may be allocated the plurality of PUCCH resource units as a group.

The wireless device 120 may be configured with multiple groups of PUCCH resources configured e.g., by RRC, as shown in Table 2. Each group of PUCCH resources may comprise a plurality of PUCCH resources which may also be semi-statically configured e.g., by RRC.

In some embodiments, the plurality of PUCCH resource units may be identifiable by an indicator in a single DL scheduling assignment which is transmitted to the wireless device. That is, the plurality of PUCCH resource units may be identifiable by a single indicator in a respective single DL scheduling assignment. The single DL scheduling assignment may correspond to a Physical Downlink Control Channel (PDCCH) or an Enhanced Physical Downlink Control Channel (EPDCCH) for the wireless device 120.

The indicator may be understood as a number or value representing the plurality of PUCCH resource units. As an example of the indicator, the group of PUCCH resources may be represented by a single scalar index. The scalar index may be mapped to one or a plurality of PUCCH resources according to some predefined rules. As one example of such rules, $\{0, \ldots, X\}$ may correspond to a set of single PUCCH resources, $\{X+1, \ldots, Y\}$ may correspond to a set of resource combinations with each index denoting two PUCCH resources, $\{Y+1, \ldots, Z\}$ may correspond to a set of resource combinations with each index denoting three PUCCH resources, etc . . . . In these examples, a resource index between 0 and X may correspond to one PUCCH resource, and X may correspond to the total number of PUCCH resources in the system, e.g., in the subframe. A resource index between X+1 and Y may correspond to a PUCCH combination with two PUCCH resources and Y-X may correspond to the total number of two PUCCH resource combinations. A resource index between Y+1 and Z may correspond to a PUCCH combination with three PUCCH resources and Z-Y may correspond to the total number of three PUCCH resource combinations.

The PUCCH resources mentioned above may be from one of the existing PUCCH formats, e.g. PUCCH format 3, so that the 3GPP Release 10 channel structure may be reused. At the physical layer, one of the PUCCH resource groups may be dynamically indicated by a predefined DCI field, for example, in the (E)PDCCH DL assignment in the secondary cells. As an example, the DCI field may be the TPC field, as shown in Table 2. Moreover, the wireless device 120 may assume that the same PUCCH resource values are transmitted in each DCI format of the corresponding (E)PDCCH assignments.

In some embodiments, the configuring 401 may comprise configuring 401 the wireless device 120 with a set of pluralities of PUCCH resource units, that is, with multiple groups of PUCCH resources, as mentioned above. In such embodiments, each of the pluralities of PUCCH resource units may be identifiable by a respective indicator in a respective single DL scheduling assignment.

In some embodiments, each of the pluralities of PUCCH resource units may be represented by a single index, e.g., a scalar index such as that described earlier, each single index corresponding to the respective indicator.

In some particular embodiments, each of the pluralities of PUCCH resource units may be grouped, although in other embodiments, only some of the pluralities may be grouped.

In some embodiments, at least one of the pluralities of PUCCH resource units is associated with the number of DL aggregated carriers. In some particular embodiments, each of the pluralities of PUCCH resource units are associated with the number of DL aggregated carriers. In some embodiments wherein carrier aggregation is used, the single DL scheduling assignment may comprise a field for each of the aggregated carriers, e.g., a predefined DCI field, for example, in the (E)PDCCH DL assignment in the secondary cells. By packing multiple PUCCH resources together, the DCI field may indicate several PUCCH resources.

TABLE 2

PUCCH Resource Value for HARQ-ACK Resource for PUCCH

| Value of 'TPC command for PUCCH' or 'HARQ-ACK resource offset' $n_{PUCCH}^{(3,\tilde{p})}$ | |
|---|---|
| '00' | The 1st group of PUCCH resource values configured by the higher layers |
| '01' | The $2^{nd}$ group of PUCCH resource values configured by the higher layers |
| '10' | The $3^{rd}$ group of PUCCH resource values configured by the higher layers |
| '11' | The $4^{th}$ group of PUCCH resource values configured by the higher layers |

In some embodiments, the PUCCH resource units may be of PUCCH format 3. If PUCCH format 3 is concerned, the PUCCH resources may correspond to either the same physical block with different orthogonal sequences or different PUCCH resources in separate resource blocks. The PUCCH resources corresponding to each TPC index may be on the same component carrier or they may also be on different component carriers. In order to realize this, the radio node 101 may need to include the serving cell index when the PUCCH resources are configured.

Peak to Average Power Ratio (PAPR) is one of the design challenges for UL in OFDM systems. PAPR may be understood as the ratio between the average transmit power of a signal and the maximum instantaneous transmit power and it may have implications on a power amplifier. In order to reduce PAPR, it may be preferable to have consecutive PUCCH resource allocations. Otherwise, the lower PAPR property of the Single Carrier Frequency-Division Multiple Access (SC-FDMA) may be break. SC-FDMA may be interpreted as a linearly preceded orthogonal Frequency-Division Multiple Access (OFDMA) scheme, in the sense that it may have an additional Discrete Fourier Transform (DFT) processing step preceding the conventional OFDMA processing. The DFT outputs may be mapped to a subset of consecutive subcarriers, thereby confining them to only a fraction of the system bandwidth. Owing to its inherent single carrier structure, a prominent advantage of SC-FDMA over OFDM and OFDMA may be that its transmit signal has a lower peak-to-average power ratio (PAPR). If the Physical Resource Block (PRB) allocation is non-contiguous in frequency, the lower PAPR property may not be maintained. In order to reduce the PAPR at the UE, each group of PUCCH resources may correspond to consecutive physical resource blocks. This may be done by restricting the difference of the two consecutive PUCCH resource values within the twice of length of the orthogonal sequence. Hence, in some embodiments, at least one of the pluralities of PUCCH resource units may be mapped to consecutive resource units.

In terms of how to organize the HARQ-ACK bits to be reported by the wireless device 120 within the configured plurality of PUCCH resource units, the ordering for the HARQ-ACK bits may follow the increasing order of the scheduled serving cells index. This approach may have the benefit of resource saving, in case many serving cells are configured but only a few of them have PDSCH transmissions or Semi-Persistent Scheduling (SPS) release. In case one PUCCH resource may not carry all the HARQ-ACK bits for the scheduled serving cells, one alternative may be to fill up PUCCH resources in an increasing order, first to use up the 1st PUCCH resource, also referred to as $1^{st}$ PUCCH resource unit, then the 2nd PUCCH resource, also referred to as $2^{nd}$ PUCCH resource unit, and so on. Another alternative may be to split the HARQ-ACK bits equally on all the available resources. In case one of the aggregated serving cell is TDD, the HARQ-ACK bits corresponding to the same TDD component carrier may be carried only on one PUCCH format resource.

Figure 5:
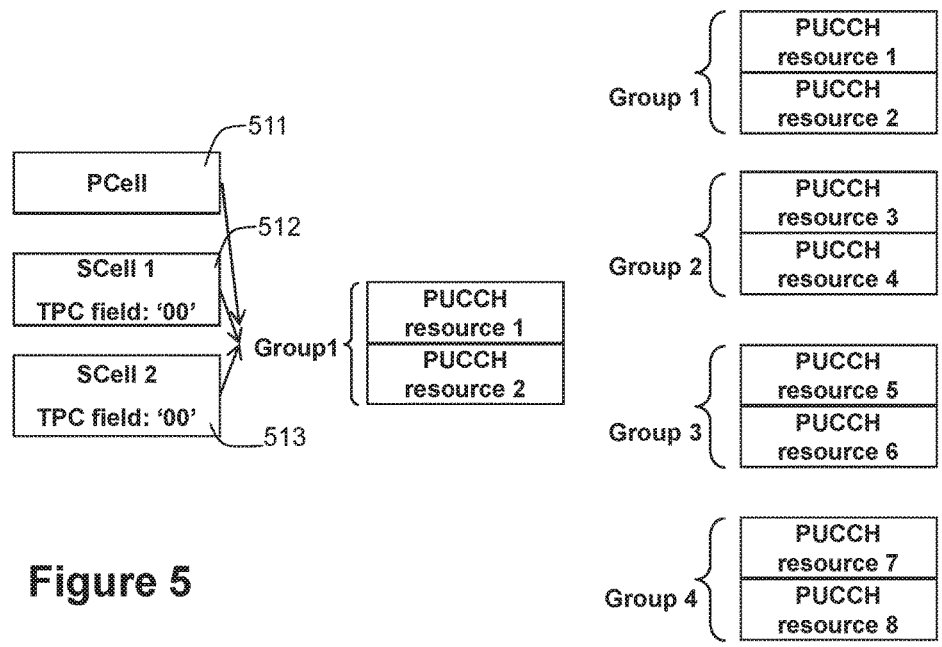
FIG. 5 is a schematic diagram illustrating embodiments of a method in a radio node, according to some embodiments.

One example according to Alternative 1 is shown in FIG. 5, which will be described later.

Alternative 2

According to Alternative 2, in any of the above, or in other embodiments, for at least some of the aggregated carriers in the number of downlink aggregated carriers, each aggregated carrier may be allocated a different PUCCH resource unit within the plurality of PUCCH resource units, wherein each PUCCH resource unit may be identifiable by a respective indicator in a respective single DL scheduling assignment. A respective DL scheduling assignment may be understood herein as the DL scheduling assignment wherein a particular PUCCH resource unit may be specified or indicated.

In an example, the wireless device 120 may be configured with multiple PUCCH resources configured e.g., by RRC, similar to the existing scheme as shown in Table 1. Each PUCCH resource may be a LTE 3GPP Release 10 PUCCH format 3, so that the existing channel structure may be reused. At the physical layer, one predefined field of (E)PDCCH DL assignment in each of the secondary cells may dynamically indicate one PUCCH resource, e.g., through the respective indicator. Respective indicator may be understood herein as meaning that each PUCCH resource unit within the plurality of PUCCH resource units has its corresponding, different, indicator in its corresponding DL scheduling assignment. The said fields in the DCI format of the (E)PDCCH DL assignment in different secondary cells may be different, so that multiple PUCCH resources may be allocated to one wireless device, that is, the wireless device 120. However, the field for some of the serving cells may be the same, implying that same PUCCH resources are allocated for these resources, that is, these serving cells with the same said fields.

As stated earlier, the indicator may be comprised in a field, of the single DL scheduling assignment, e.g., a predefined DCI field, for example, in the (E)PDCCH DL assignment in the secondary cells.

There may be multiple approaches to implement the DCI field to indicate the PUCCH resources, which may be applied to both for Alternative 1 and Alternative 2.

In the first approach, a TPC field may be used. Each TPC index may indicate one PUCCH resource selected from the configured PUCCH resources, e.g., configured in Action 401. In this approach, each DL component carrier may have its own PUCCH resource configuration. For example, each DL component carrier may be allocated a different PUCCH resource unit within the plurality of PUCCH resource units. The PUCCH resources of different component carriers may be overlapped.

In the second approach, the field may consist of two sections, one section, e.g., a first section, is to indicate the UL component carrier which carries the PUCCH resource, and one section, e.g., a second section, is to indicate the PUCCH resource offset with respect to the first PUCCH resource within the component carrier. With this approach, the advantage is to enable the radio node 101 to dynamically allocate the PUCCH resource based on the DL scheduling, via setting a different value to the first section in the DCI. For example, when the wireless device 102 may be configured with two UL component carriers, if the load of one UL component carrier is light, the scheduler may put all the PUCCH on that UL component carrier via setting the same value in the first section. If the load for both the UL component carriers are heavy, the PUCCH may be distributed into two UL component carriers to balance the load via setting a different value in the first section. However, more DCI bits may be needed to indicate the PUCCH resource.

In the third approach, the PUCCH resource may be decided by the DCI field, which may indicate the PUCCH resource together with the serving cell index information. In this approach, the feedback of the one DL component carrier may be one-to-one associated with one UL component carrier. The association may be predefined or statically configured. The DCI field may only represent the PUCCH resource within the associated UL component carrier. In order to decide the PUCCH resource, the wireless device 120 may need to determine the UL component carrier which carries the PUCCH, based on the configured association, then determine, that is, derive, the PUCCH resource based on the PUCCH resource indicated by the field and the determined uplink component carrier.

The HARQ-ACK bits for the primary cell 131 may be reported on a predefined PUCCH resource. One option is to map the HARQ-ACK bits for the primary cell 131 on the resources indicated by the TPC field in DCI format of the (E)PDCCH DL assignment of secondary cells with the lowest cell index, since the TPC field of primary cell 131 may e.g., be used for transmit power control, not for PUCCH resource index. For the HARQ-ACK bits for the secondary cells, they may be transmitted on the resources indicated by the by the DCI field in DCI format of the (E)PDCCH DL assignment of same secondary cell.

Figure 6:
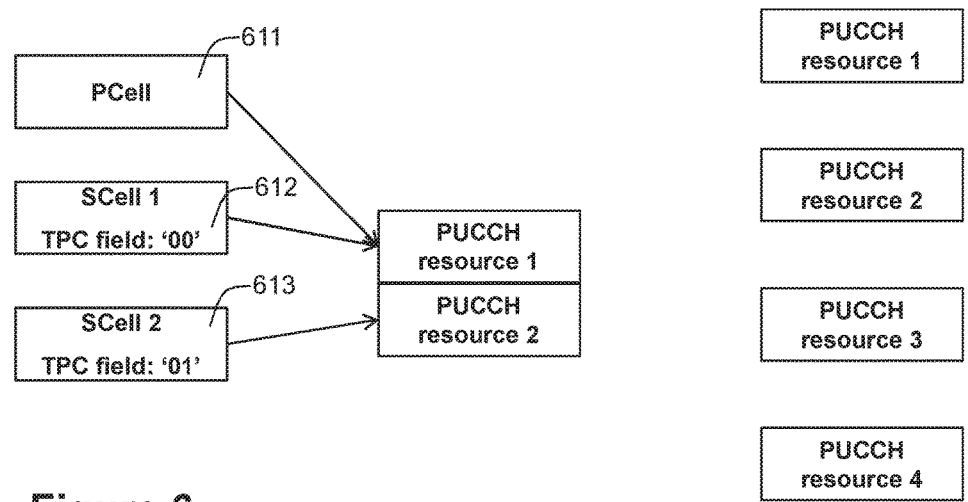
FIG. 6 is a schematic diagram illustrating embodiments of a method in a radio node, according to some embodiments.

One example according to Alternative 2 is shown in FIG. 6, which will be described later. As an example in FIG. 6, the HARQ-ACK bits for SCell 1 may be carried on PUCCH resource 1 and the HARQ-ACK bits for SCell 2 may be carried on PUCCH resource 2.

To summarize this Action 401, by the radio node 101 configuring the wireless device 120 with the plurality of PUCCH resource units, wherein the plurality of PUCCH resource units is associated with a number of DL aggregated carriers, the wireless device 120 is provided with a larger capacity to provide feedback information to the radio node 101 in the UL, about the DL aggregated carriers.

Action 402

When the radio node 101 has something e.g. data and/or control information to transmit to the wireless device 120, it may send a DL grant to the wireless device 120, and select one of the PUCCH resources configured for the wireless device 120. Thus, in this action, the radio node 101 may select a plurality out of the configured set of pluralities of PUCCH resource units for allocation to the wireless device 120. This action is optional.

In some embodiments, the selecting 402 may be based on at least one of: a) a number of aggregated carriers used for transmission between the radio node 101 and the wireless device 120, that is, how many aggregated carriers are used, DL, UL or both, b) a type of carriers used for transmission between the radio node 101 and the wireless device 120, e.g., carriers using licensed spectrum or unlicensed spectrum, DL, UL or both, c) a type of uplink information transmitted by the wireless device 120 from: a Hybrid Automatic Repeat reQuest-ACKnowledgement (HARQ-ACK), a scheduling request (SR), and a periodic Channel State Information (CSI), and d) a duplex mode used in each of the carriers used for transmission out of: a Time Division Duplex mode and a Frequency Division Duplex mode.

As one example for a), when the number of aggregated carriers is smaller, the resource index between 0 and X may be selected, when the number of aggregated carriers is larger, the resource index between Y and Z may be selected.

As another example for b), when most of the carriers use licensed spectrum, more bits may be expected, and the resource index between Y and Z may be selected. When most of the carriers use unlicensed spectrum, the feedback bits may be bundled together and thus the expected feedback bits may be reduced. Hence, the resource index between 0 and X may be selected.

As another example for c), when there is only HARQ-ACK needed to feedback, few bits may be expected, and the resource index between 0 and X may be selected. When the feedback includes both CSI and HARQ-ACK bits, more bits may be expected, and the resource index between Y and Z may be selected.

As another example for d), when TDD is configured for all the carriers, more feedback bits may be expected, and the resource index between Y and Z may be selected. When FDD is configured for all the carriers, few feedback bits may be expected, and the resource index between 0 and X may be selected.

Action 403

Once the radio node 101 has selected the plurality of PUCCH resource units, the radio node 101 may indicate the selected plurality of PUCCH resource units to the wireless device 120 in a DL scheduling assignment. This action is optional.

In some embodiments, the indicating 403 may comprise sending the respective indicator to the wireless device 120 for the selected plurality of PUCCH resource units, the indicator being comprised in a field of the respective single DL scheduling assignment.

The field may be one of: a) the TCP field; b) a field comprising two sections, wherein one section is to indicate a UL component carrier which carries the selected plurality of PUCCH resource units, and one section is to indicate the PUCCH resource offset with respect to a first PUCCH resource unit within the UL component carrier; and c) a DCI field, which indicates the selected plurality of PUCCH resource units together with a serving cell index information.

In some embodiments, the respective single DL scheduling assignment is sent over a Physical Downlink Control Channel PDCCH or an Enhanced Physical Downlink Control Channel EPDCCH.

Action 404

The selected plurality of PUCCH resource units indicated to the wireless device 120 may then be used by the wireless device 120 to send UL information, e.g., a HARQ-ACK, to the radio node 101. Thus, in this action, the radio node 101 may receive UL information from the wireless device 120 on the selected plurality of PUCCH resource units.

One example of the PUCCH resource determination or selection of Action 402, according to embodiments herein for the Alternative 1 described above is shown in FIG. 5, wherein the wireless device 120 uses carrier aggregation of three DL component carriers for transmission, e.g., from the radio node 101; a primary cell (PCell) 131, a first Secondary Cell (SCell 1) such as the secondary cell 132, and a second Secondary Cell (SCell 2), such as the secondary cell 132. In FIG. 5, a PUCCH resource unit is represented as a rectangle, labeled as "PUCCH resource", and a resource number. In this example, each group comprises two PUCCH resource units. Each of the four groups represented corresponds to a respective PUCCH resource group configured by the radio node 101, e.g., by the higher layers. On the left side of the figure, the rectangle at the top represents a DL scheduling assignment 511 in the PCell 131 for the wireless device 120, the rectangle in the middle represents a DL scheduling assignment 512 in the SCell 1 for the wireless device 120, and the rectangle at the bottom represents a DL scheduling assignment 513 in the SCell 2 for the wireless device 120. In this example, the DL scheduling assignment in the PCell 131 is mapped to the first Group of PUCCH resources, PUCCH resource 1 and PUCCH resource 2, out of the four different groups: Group 1, Group 2, Group 3 and Group 4. Also in this example, a 00 value, the indicator, in the TPC field of a PDCCH for the wireless device 120, is mapped to the first Group of PUCCH. According to Action 402, the radio node 101 serving the wireless device 120 may have selected Group 1 for the wireless device 120 out of the four groups of PUCCH resources based on one of the number of component carriers that is scheduled for the wireless device 120. In summary, FIG. 5 shows an example of embodiments herein wherein each aggregated carrier, PCell, SCell 1 and SCell 2, in the number of downlink aggregated carriers, PCell+SCell 1+SCell 2, is allocated the plurality of PUCCH resource units, PUCCH resource 1 and PUCCH resource 2, as a group, called Group 1. The plurality of PUCCH resource units, PUCCH resource 1 and PUCCH resource 2, is identifiable by a single indicator, '00', in a respective single Downlink, DL, scheduling assignment 511, 512, 513.

One example of the PUCCH resource determination according to embodiments herein for the Alternative 2 described above is given in FIG. 6. In this example, the wireless device 120 uses carrier aggregation of three carriers for transmission e.g., from the radio node 101: the primary cell (PCell) 131, a first Secondary Cell (SCell 1) such as the secondary cell 132, and a second Secondary Cell (SCell 2) such as the secondary cell 132. On the left side of the figure the rectangle at the top represents a DL scheduling assignment 611 in the PCell 131 for the wireless device 120, the rectangle in the middle represents a DL scheduling assignment 612 in the SCell 1 for the wireless device 120, and the rectangle at the bottom represents a DL scheduling assignment 613 in the SCell 2 for the wireless device 120. In this example, the DL scheduling assignment 611 in the PCell 131 is mapped to the first PUCCH resource unit, PUCCH resource 1. Also in this example, a 00 value, the indicator, in the TPC field of a PDCCH for the wireless device 120 in the SCell 1 132, is mapped to the first PUCCH resource unit. A 01 value in the TPC field of a PDCCH for the wireless device 120 in the SCell 2, is mapped to the second PUCCH resource unit, PUCCH resource 2, out of the four different PUCCH resource units. The radio node 101 serving the wireless device 120 may have selected PUCCH resource 1 and PUCCH resource 2 for the wireless device 120 out of the four PUCCH resources, in this example, based on, for example, the fact that SCell 1 is using licensed spectrum while SCell 2 132 is using unlicensed spectrum. In summary, FIG. 6 shows an example of embodiments herein wherein for at least some of the aggregated carriers, SCell 1 and SCell 2, in the number of downlink aggregated carriers, PCell+SCell 1+SCell 2, each aggregated carrier, SCell 1 and SCell 2, is allocated a different PUCCH resource unit, PUCCH resource 1 and PUCCH resource 2, within the plurality of PUCCH resource units, PUCCH resource 1 and PUCCH resource 2, wherein each PUCCH resource unit is identifiable by a respective indicator, '00' or '01', in a respective single Downlink, DL, scheduling assignment 611, 612, 613.

Figure 7:
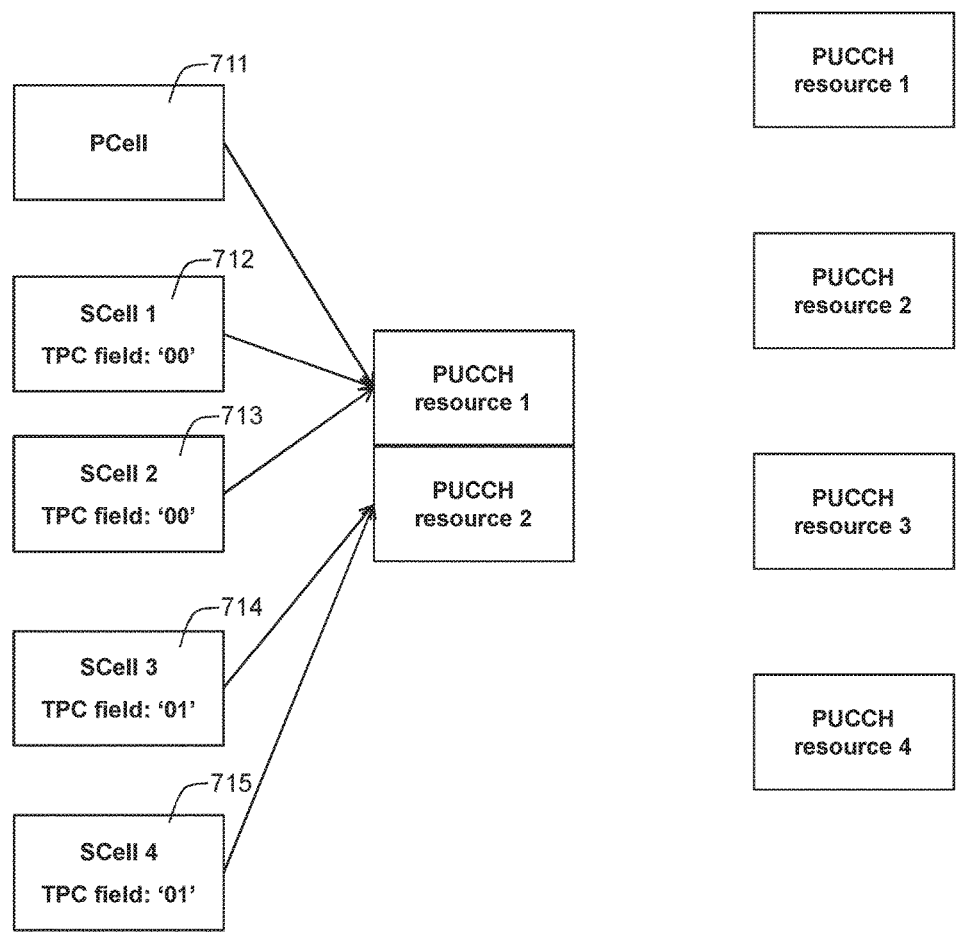
FIG. 7 is a schematic diagram illustrating embodiments of a method in a radio node, according to some embodiments.

FIG. 7 illustrates another example of the above example, for the wireless device 120, wherein the wireless device 120 uses CA with 5 component carriers: a PCell 131 and SCell 1 to 4, each such as the secondary cell 132. In this example, a first PUCCH resource unit, PUCCH resource 1, is mapped to the DL scheduling assignment 711 in the PCell 131. Also in this example, the first PUCCH resource unit, PUCCH resource 1, is mapped to a 00 value, the indicator, in the TPC field of a PDCCH for the wireless device 120 in the SCell 1, corresponding to its DL scheduling assignment 712, and SCell 2, corresponding to its DL scheduling assignment 713, and a second PUCCH resource unit, PUCCH resource 2, is mapped to a 01 value in the TPC field of a PDCCH for the UE in the SCell 3, corresponding to its DL scheduling assignment 714, and SCell 4, corresponding to its DL scheduling assignment 714. In summary, FIG. 7 shows an example of embodiments herein wherein for at least some of the aggregated carriers, SCell 1 and SCell 2 on the one hand and SCell 3 and SCell 4 on the other, in the number of downlink aggregated carriers, PCell+SCell 1+SCell 2+SCell 3+SCell 4, each aggregated carrier, SCell 1 or SCell 2 on the one hand and SCell 3 or SCell 4 on the other, is allocated a different PUCCH resource unit, PUCCH resource 1 and PUCCH resource 2, within the plurality of PUCCH resource units, PUCCH resource 1 and PUCCH resource 2, wherein each PUCCH resource unit is identifiable by a respective indicator, '00' or '01', in a respective single Downlink, DL, scheduling assignment 711, 712, 713, 714, 715. What this example in FIG. 7 shows is that the UL capacity of the wireless device 120 may also be increased by assigning multiple DL carriers to the same UL resource.

As may be understood from the examples provided by FIGS. 5-7, the PUCCH capacity for the wireless device 120 may be increased by the radio node 101 either configuring the plurality of PUCCH resources for one or several CCs, or by configuring several CC to a same PUCCH resource. This may be compared with existing methods wherein a single PUCCH resource is always configured for multiple aggregated CC.

Figure 8:
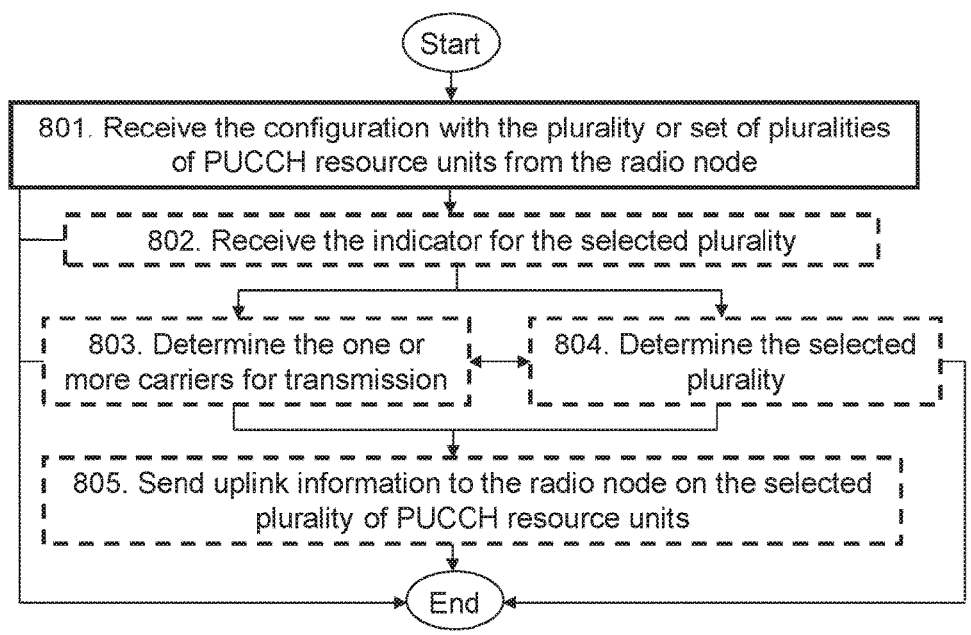
FIG. 8 is a schematic diagram illustrating actions of a method in a wireless device, according to some embodiments.

Embodiments of a method performed by the wireless device 120 for receiving the configuration from the radio node 101, will now be described with reference to the flowchart depicted in FIG. 8.

The method may comprise the following actions, which actions may as well be carried out in another suitable order than that described below. In some embodiments, the wireless device 120 may perform all actions, whereas in other embodiments, some actions may be performed. In some embodiments, the order of the actions illustrated in FIG. 8 may be changed in one or more actions. The optional actions are indicated. One or more embodiments may be combined, where applicable. All possible combinations are not described to simplify the description.

The detailed description of some of the following corresponds to the same references provided above, in relation to the actions described for the radio node 101, and will thus not be repeated here. For example, the single DL scheduling assignment may correspond to a PDCCH or a EPDCCH for the wireless device 120.

Action 801

As described earlier, in order to increase the capacity of the PUCCH, and therefore enable UL transmission of control information using carrier aggregation of a large number of carriers in the DL from the radio node 101, e.g., 32 CC, in this action, the wireless device 120 receives the configuration from the radio node 101 with the plurality of PUCCH resource units, wherein the plurality of PUCCH resource units is associated with the number of DL aggregated carriers.

As mentioned before, this action may be implemented, for example, by the receiving the RRC message from the radio node 101. The PUCCH resource units may be of PUCCH format 3.

The configuration according to Action 801 may be implemented according to the two alternatives 1 and 2 that were described in relation to Action 401. Only some aspects will be summarized here. In summary, according to Alternative 1, in some embodiments, each aggregated carrier in the number of DL aggregated carriers may be allocated the plurality of PUCCH resource units as a group, wherein the plurality of PUCCH resource units may be identifiable by the single indicator in the respective single DL scheduling assignment.

In some embodiments, the plurality may be identifiable by the indicator in the single DL scheduling assignment.

In some embodiments, the configuration from the radio node 101 may comprise the set of pluralities of PUCCH resource units.

In some embodiments, each of the pluralities of PUCCH resource units may be identifiable by the respective indicator in the respective single DL scheduling assignment.

In some embodiments each of the pluralities of PUCCH resource units may be represented by a single index, each single index corresponding to the respective indicator.

In some embodiments, each of the pluralities of PUCCH resource units may be grouped.

In some embodiments, at least one each of the pluralities of PUCCH resource units may be associated with the number of DL aggregated carriers. In some particular embodiments, all of the pluralities of PUCCH resource units are associated with the number of DL aggregated carriers.

How the wireless device 120 may organize the HARQ-ACK bits to be reported to the radio node 101 within the configured plurality of PUCCH resource units, has already been described in Action 401, and will not be repeated here.

Accordingly, in some embodiments, at least one of the pluralities of PUCCH resource units may be mapped to consecutive resource units.

According to Alternative 2, in some of these or other embodiments, for at least some of the aggregated carriers in the number of downlink aggregated carriers, each aggregated carrier may be allocated a different PUCCH resource unit within the plurality of PUCCH resource units, wherein each PUCCH resource unit may be identifiable by the respective indicator in the respective single DL scheduling assignment.

Action 802

As explained above in reference to Actions 402 and 403, when the radio node 101 has something e.g. data and/or control information to transmit to the wireless device 120, it may send a DL grant to the wireless device 120, and select one of the PUCCH resources configured for the wireless device 120. Thus, in this action, the wireless device 120 may receive the indication from the radio node 101 with the selected plurality out of the configured set of pluralities of PUCCH resource units for allocation to the wireless device 120, in a DL scheduling assignment. This action is optional.

In some embodiments, the receiving 802 may comprise receiving the respective indicator from the radio node 101 for the selected plurality, the indicator being comprised in the field of the respective single DL scheduling assignment.

In some embodiments, the field may be one of: a) the TCP field; b) the field comprising two sections, wherein one section is to indicate a UL component carrier which carries the selected plurality of PUCCH resource units, and one section is to indicate the PUCCH resource offset with respect to a first PUCCH resource unit within the UL component carrier; and c) the DCI field, which indicates the selected plurality of PUCCH resource units together with a serving cell index information.

In some embodiments, the selected plurality of PUCCH resource units may have been selected by the radio node 101 based on at least one of: the number of aggregated carriers used for transmission between the radio node 101 and the wireless device 120 DL, UL or both, the type of carriers used for transmission between the radio node 101 and the wireless device 120 DL, UL or both, the type of uplink information transmitted by the wireless device 120 from: the HARQ-ACK, the SR and the periodic CSI, and the duplex mode used in each of the carriers used for transmission out of: the TDD mode or the FDD mode.

In some embodiments, the respective single DL scheduling assignment may be received over the PDCCH or the EPDCCH.

Action 803

The wireless device 120 may then need to determine which carrier may carry the PUCCH based on the configuration mentioned previously, e.g., based on the value in the first section of the TPC field. Thus, in this action, the wireless device 120 may determine one or more carriers for transmission of UL information on the selected plurality of the PUCCH resource units to the radio node 101. This action is optional.

Action 804

The wireless device 120 may then need to derive the PUCCH resource based on the indication received in PDCCH. For that purpose, in this action, the wireless device 120 may determine, e.g., derive, the selected plurality of the PUCCH resource units, based on the received indication and the received configuration from the radio node 101. For example, in regards to the Table 2 described earlier, in action 801, all the information in Table 2 may received. As described in action 802, one value may have been selected from the first column of Table 2 to send to the wireless device 120, i.e., "00". Based on Table 2 and the "00", the wireless device 120 may need to map which physical resource may be used, for example, which PRBs, which cover code, which sequence, etc. may be used Action 805

In this action, the wireless device 120 may send the UL information, e.g., a HARQ-ACK, to the radio node 101 on the selected plurality of PUCCH resource units.

In some embodiments, the sending 805 the UL information to the radio node 101 comprises sending the UL information on the derived plurality of PUCCH resource units, and using the determined one or more carriers.

By the wireless device 120 having received the configuration from the radio node 101 with the plurality of PUCCH resource units, which plurality of PUCCH resource units is associated with the number of DL aggregated carriers, the wireless device 120 may now in this Action 805 send the UL information to the radio node 101 about a large number of aggregated carriers, e.g., 32 CC.

To perform the method actions described above in relation to FIGS. 4-7, the radio node 101 is configured to configure the wireless device 120. The radio node 101 comprises the following arrangement depicted in FIG. 9. As already mentioned, the radio node 101 and the wireless device 120 are configured to operate in the wireless communications network 100.

The detailed description of some of the following corresponds to the same references provided above, in relation to the actions described for the radio node 101, and will thus not be repeated here.

The radio node 101 is further configured to, e.g., by means of a configuring module 901, to configure the wireless device 120 with the plurality of PUCCH resource units, wherein the plurality of PUCCH resource units is associated with the number of DL aggregated carriers.

In some embodiments, for at least some of the aggregated carriers in the number of downlink aggregated carriers, each aggregated carrier may be configured to be allocated a different PUCCH resource unit within the plurality of PUCCH resource units, wherein each PUCCH resource unit may be identifiable by the respective indicator in the respective single DL scheduling assignment.

In some of these or other embodiments, each aggregated carrier in the number of DL aggregated carriers may be configured to be allocated the plurality of PUCCH resource units as a group, wherein the plurality of PUCCH resource units may be identifiable by the single indicator in the respective single DL scheduling assignment.

In some embodiments, the plurality may be identifiable by the indicator in the single DL scheduling assignment.

The configuring module 901 may be a processor 906 or processing module of the radio node 101.

In some embodiments, to configure comprises to configure the wireless device 120 with the set of pluralities of PUCCH resource units, each of the pluralities being identifiable by the respective indicator in the respective single DL scheduling assignment. This may also be implemented by means of the configuring module 901.

In some embodiments, each of the pluralities of PUCCH resource units is represented by the single index, each single index corresponding to the respective indicator.

In some embodiments, each of the pluralities of PUCCH resource units is grouped.

In some embodiments, at least one of the pluralities of PUCCH resource units is associated with the number of DL aggregated carriers.

In some embodiments, at least one of the pluralities of PUCCH resource units is mapped to consecutive resource units.

In some embodiments, the PUCCH resource units are of PUCCH format 3.

The radio node 101 may further configured to, e.g., by means of a selecting module 902 configured to, select the plurality out of the configured set of pluralities of PUCCH resource units for allocation to the wireless device 120.

The selecting module 902 may be the processor 906 of the radio node 101.

In some embodiments, to select is configured to be based on at least one of: the number of aggregated carriers used for transmission between the radio node 101 and the wireless device 120 DL, UL or both, the type of carriers used for transmission between the radio node 101 and the wireless device 120 DL, UL or both, the type of uplink information transmitted by the wireless device 120 from: the HARQ-ACK, the SR and the periodic CSI, and the duplex mode used in each of the carriers used for transmission out of: the TDD mode or the FDD mode. This may also be implemented by means of the selecting module 902.

The radio node 101 may further configured to, e.g., by means of an indicating module 903 configured to, indicate the selected plurality to the wireless device 120 in the DL scheduling assignment.

The indicating module 903 may be the processor 906 of the radio node 101.

In some embodiments, to indicate comprises to send the respective indicator to the wireless device 120 for the selected plurality. The indicator may be comprised in the field of the respective single DL scheduling assignment.

In some embodiments, the field may be one of: a) the TCP field; b) the field comprising two sections, wherein one section is to indicate a UL component carrier which carries the selected plurality of PUCCH resource units, and one section is to indicate the PUCCH resource offset with respect to a first PUCCH resource unit within the UL component carrier; and c) the DCI field, which indicates the selected plurality of PUCCH resource units together with a serving cell index information.

In some embodiments, the respective single DL scheduling assignment is configured to be sent over a PDCCH or a EPDCCH.

The radio node 101 may further configured to, e.g., by means of a receiving module 904 configured to, receive uplink information from the wireless device 120 on the selected plurality of PUCCH resource units.

The receiving module 904 may be the processor 906 of the radio node 101.

The radio node 101 may be configured to perform other actions with other modules configured 905 to perform these actions within the radio node 101. Each of the other modules 905 may be the processor 906 of the radio node 101, or an application running on such processor.

Figure 9:
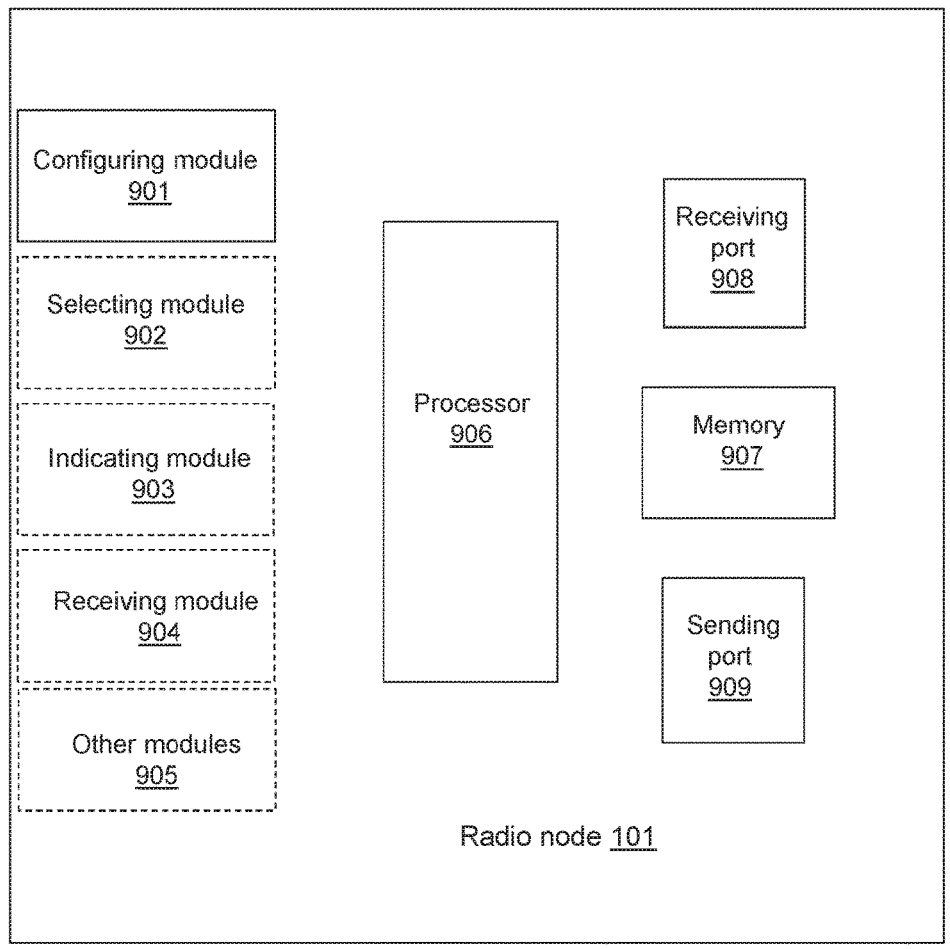
FIG. 9 is a block diagram of a radio node that is configured according to some embodiments.

The embodiments herein for configuring the wireless device 120 may be implemented through one or more processors, such as the processor 906 in the radio node 101 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the radio node 101. One such carrier may be in the form of a CD ROM disc. It is however feasible with other data carriers such as a memory stick. The computer program code may furthermore be provided as pure program code on a server and downloaded to the radio node 101. As indicated above, the processor 906 may comprise one or more circuits, which may also be referred to as one or more modules in some embodiments, each configured to perform the actions carried out by the radio node 101, as described above in reference to FIG. 9, e.g., the configuring module 901, the selecting module 902, the indicating module 903, and the receiving module 904. Hence, in some embodiments, the configuring module 901, the selecting module 902, the indicating module 903, the receiving module 904, and the other modules 905 described above may be implemented as one or more applications running on one or more processors such as the processor 906. That is, the methods according to the embodiments described herein for the radio node 101 are respectively implemented by means of a computer program product, comprising instructions, i.e., software code portions, which, when executed on at least one processor, cause the at least one processor to carry out the actions described herein, as performed by the radio node 101. The computer program product may be stored on a computer-readable storage medium. The computer-readable storage medium, having stored thereon the computer program, may comprise instructions which, when executed on at least one processor, cause the at least one processor to carry out the actions described herein, as performed by the radio node 101. In some embodiments, the computer-readable storage medium may be a non-transitory computer-readable storage medium, such as a CD ROM disc, or a memory stick. In other embodiments, the computer program product may be stored on a carrier containing the computer program, wherein the carrier is one of an electronic signal, optical signal, radio signal, or the computer-readable storage medium, as described above.

The radio node 101 may further comprise a memory 907 comprising one or more memory units. The memory 907 may be arranged to be used to store obtained information, such as the information received by the processor 906, store data configurations, scheduling, and applications etc. to perform the methods herein when being executed in the radio node 101. Memory 907 may be in communication with the processor 906. Any of the other information processed by the processor 906 may also be stored in the memory 907.

In some embodiments, information e.g., from the wireless device 120, may be received through a receiving port 908. The receiving port 908 may be in communication with the processor 906. The receiving port 908 may also be configured to receive other information.

The processor 906 may be further configured to send messages, e.g., to the wireless device 120, through a sending port 909, which may be in communication with the processor 906, and the memory 907.

Those skilled in the art will also appreciate that the any module within the radio node 101, e.g., the configuring module 901, the selecting module 902, the indicating module 903, the receiving module 904, and the other modules 905 described above, may refer to a combination of analog and digital circuits, and/or one or more processors configured with software and/or firmware, e.g. stored in the memory, that when executed by the one or more processors such as the processor 906, perform actions as described above, in relation to FIGS. 4-7. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

To perform the method actions described above in relation to FIG. 8, the wireless device 120 is configured to receive the configuration from the radio node 101. The wireless device 120 comprises the following arrangement depicted in FIG. 10. As already mentioned, the radio node 101 and the wireless device 120 are configured to operate in the wireless communications network 100.

The detailed description of some of the following corresponds to the same references provided above, in relation to the actions described for the wireless device 120, and will thus not be repeated here.

The wireless device 120 is further configured to, e.g., by means of a receiving module 1001 configured to, receive the configuration from the radio node 101 with the plurality of PUCCH resource units, wherein the plurality of PUCCH resource units is associated with the number of DL aggregated carriers.

In some embodiments, for at least some of the aggregated carriers in the number of downlink aggregated carriers, each aggregated carrier may be configured to be allocated a different PUCCH resource unit within the plurality of PUCCH resource units, wherein each PUCCH resource unit may be identifiable by the respective indicator in the respective single DL scheduling assignment.

In some of these or other embodiments, each aggregated carrier in the number of DL aggregated carriers may be configured to be allocated the plurality of PUCCH resource units as a group, wherein the plurality of PUCCH resource units may be identifiable by a single indicator in the respective single DL scheduling assignment.

In some embodiments, the plurality may be identifiable by the indicator in the single DL scheduling assignment.

The receiving module 1001 may be a processor 1004 or processing module of the wireless device 120.

In some embodiments, the configuration from the radio node 101 comprises the set of pluralities of PUCCH resource units, each of the pluralities being identifiable by the respective indicator in the respective single DL scheduling assignment. This may also be implemented by means of the receiving module 1001.

In some embodiments, each of the pluralities of PUCCH resource units is represented by the single index, each single index corresponding to the respective indicator.

In some embodiments, each of the pluralities of PUCCH resource units is grouped.

In some embodiments, at least one of the pluralities of PUCCH resource units is associated with the number of DL aggregated carriers.

In some embodiments, at least one of the pluralities of PUCCH resource units is mapped to consecutive resource units.

In some embodiments, the PUCCH resource units are of PUCCH format 3.

The wireless device 120 may further configured to, e.g., by means of the receiving module 1001 configured to, receive the indication from the radio node 101 with the selected plurality out of the configured set of pluralities of PUCCH resource units for allocation to the wireless device 120, in the DL scheduling assignment.

In some embodiments, to receive comprises to receive the respective indicator from the radio node 101 for the selected plurality, the indicator being comprised in the field of the respective single DL scheduling assignment. This may also be implemented by means of the receiving module 1001.

In some embodiments, the field may be one of: a) the TCP field; b) the field comprising two sections, wherein one section is to indicate a UL component carrier which carries the selected plurality of PUCCH resource units, and one section is to indicate the PUCCH resource offset with respect to a first PUCCH resource unit within the UL component carrier; and c) the DCI field, which indicates the selected plurality of PUCCH resource units together with the serving cell index information.

In some embodiments, the respective single DL scheduling assignment is configured to be received over the PDCCH or the EPDCCH.

In some embodiments, the selected plurality is configured to have been selected by the radio node 101 based on at least one of: the number of aggregated carriers used for transmission between the radio node 101 and the wireless device 120 DL, UL or both, the type of carriers used for transmission between the radio node 101 and the wireless device 120 DL, UL or both, the type of uplink information transmitted by the wireless device 120 from: the HARQ-ACK, the scheduling request SR and the periodic CSI, and the duplex mode used in each of the carriers used for transmission out of: the TDD mode and the FDD mode.

The wireless device 120 may further be configured to, e.g., by means of a determining module 1003 configured to, determine the one or more carriers for transmission of the UL information on the selected plurality of the PUCCH resource units to the radio node 101.

The determining module 1003 may be the processor 1004 of the wireless device 120.

The wireless device 120 may further configured to, e.g., by means of the determining module 1003 configured to, determine the selected plurality of the PUCCH resource units, based on the received indication and the received configuration from the radio node 101.

The wireless device 120 may further configured to, e.g., by means of a sending module 1002 configured to, send the uplink information to the radio node 101 on the selected plurality of PUCCH resource units.

The sending module 1002 may be the processor 1004 of the wireless device 120.

In some embodiments, to send the UL information to the radio node 101 comprises to send the UL information on the derived plurality of PUCCH resource units, and using the determined one or more carriers. This may also be implemented by means of the sending module 1002.

The wireless device 120 may be configured to perform other actions with other modules 1008 configured to perform these actions within the wireless device 120. Each of the other modules 905 may be the processor 1004 of the wireless device 120, or an application running on such processor.

Figure 10:
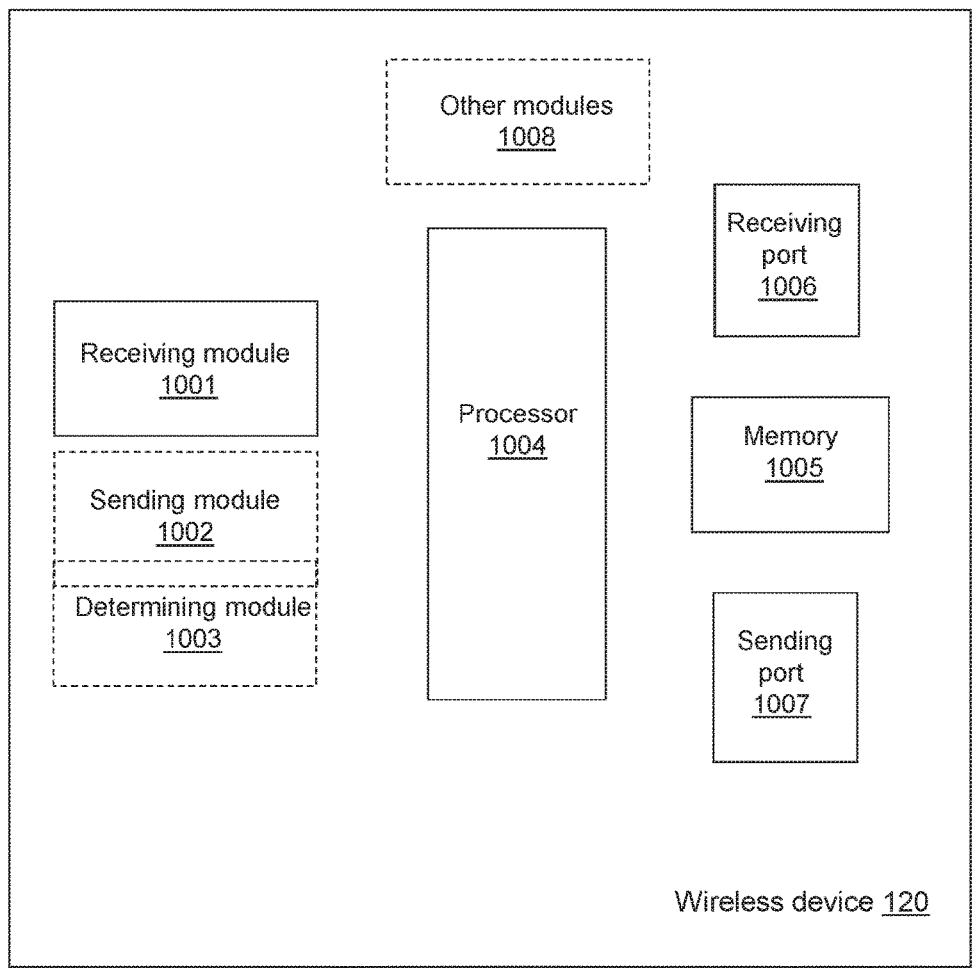
FIG. 10 is a block diagram of a wireless device that is configured according to some embodiments.

The embodiments herein for receiving the configuration from the radio node 101 may be implemented through one or more processors, such as the processor 1004 in the wireless device 120 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the wireless device 120. One such carrier may be in the form of a CD ROM disc. It is however feasible with other data carriers such as a memory stick. The computer program code may furthermore be provided as pure program code on a server and downloaded to the wireless device 120. As indicated above, the processor 1004 may comprise one or more circuits, which may also be referred to as one or more modules in some embodiments, each configured to perform the actions carried out by the wireless device 120, as described above in reference to FIG. 10, e.g., the receiving module 1001, the sending module 1002, and the determining module 1003. Hence, in some embodiments, the receiving module 1001, the sending module 1002, the determining module 1003, and the other modules 1008 described above may be implemented as one or more applications running on one or more processors such as the processor 1004. That is, the methods according to the embodiments described herein for the wireless device 120 are respectively implemented by means of a computer program product, comprising instructions, i.e., software code portions, which, when executed on at least one processor, cause the at least one processor to carry out the actions described herein, as performed by the wireless device 120. The computer program product may be stored on a computer-readable storage medium. The computer-readable storage medium, having stored thereon the computer program, may comprise instructions which, when executed on at least one processor, cause the at least one processor to carry out the actions described herein, as performed by the wireless device 120. In some embodiments, the computer-readable storage medium may be a non-transitory computer-readable storage medium, such as a CD ROM disc, or a memory stick. In other embodiments, the computer program product may be stored on a carrier containing the computer program, wherein the carrier is one of an electronic signal, optical signal, radio signal, or the computer-readable storage medium, as described above.

The wireless device 120 may further comprise a memory 1005 comprising one or more memory units. The memory 1005 may be arranged to be used to store obtained information, such as the information received by the processor 1004, store data configurations, scheduling, and applications etc. to perform the methods herein when being executed in the wireless device 120. Memory 1005 may be in communication with the processor 1004. Any of the other information processed by the processor 1004 may also be stored in the memory 1005.

In some embodiments, information e.g., from the radio node 101, may be received through a receiving port 1006. The receiving port 1006 may be in communication with the processor 1004. The receiving port 1006 may also be configured to receive other information.

The processor 1004 may be further configured to send messages, e.g., to the radio node 101, through a sending port 1007, which may be in communication with the processor 1004, and the memory 1005.

Those skilled in the art will also appreciate that the any module within the wireless device 120, e.g., the receiving module 1001, the sending module 1002, the determining module 1003, and the other modules 1008 described above, may refer to a combination of analog and digital circuits, and/or one or more processors configured with software and/or firmware, e.g. stored in the memory, that when executed by the one or more processors such as the processor 1004, perform actions as described above, in relation to FIG. 8. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention. It is to be understood that the embodiments are not to be limited to the specific examples disclosed, and that modifications and other variants are intended to be included within the scope of this disclosure. Although specific terms may be employed herein, they are used in a generic and descriptive sense only and not for purposes of limitation.

Selected examples related to embodiments herein:

Example 1 is related to a method performed by a radio node (101) for configuring a wireless device (120), the radio node (101) and the wireless device (120) operating in a wireless communications network (100), the method comprising: configuring (401) the wireless device (120) with a plurality of Physical Uplink Control Channel, PUCCH, resource units, the plurality of PUCCH resource units being identifiable by an indicator in a single Downlink, DL, scheduling assignment.

Example 2 is related to the method of example 1, wherein the configuring (401) comprises configuring (401) the wireless device (120) with a set of pluralities of PUCCH resource units, each of the pluralities of PUCCH resource units being identifiable by a respective indicator in a respective single DL scheduling assignment, the method further comprising: a) selecting (402) a plurality of PUCCH resource units out of the configured set of pluralities of PUCCH resource units for allocation to the wireless device (120), and b) indicating (403) the selected plurality of PUCCH resource units to the wireless device (120) in a DL scheduling assignment.

Example 3 is related to the method of example 2, wherein the indicating (403) comprises sending the respective indicator to the wireless device (120) for the selected plurality of PUCCH resource units, the indicator being comprised in a field of the respective single DL scheduling assignment.

Example 4 is related to the method of any of examples 2-3, wherein the selecting (402) is based on at least one of: a number of aggregated carriers used for transmission between the radio node (101) and the wireless device (120), a type of carriers used for transmission between the radio node (101) and the wireless device (120), a type of uplink information transmitted by the wireless device (120) from: a Hybrid Automatic Repeat reQuest-ACKnowledgement (HARQ-ACK), a scheduling request (SR) and a periodic Channel State Information (CSI), and a duplex mode used in each of the carriers used for transmission out of: Time Division Duplex and Frequency Division Duplex.

Example 5 is related to the method of any of examples 3-4, wherein each of the pluralities of PUCCH resource units is represented by a single index, each single index corresponding to the respective indicator.

Example 6 is related to the method of any of examples 3-5, wherein the respective single DL scheduling assignment is sent over a Physical Downlink Control Channel (PDCCH) or an Enhanced Physical Downlink Control Channel (EPDCCH).

Example 7 is related to the method of any of examples 2-6, wherein each of the pluralities of PUCCH resource units is grouped.

Example 8 is related to the method of any of examples 2-7, wherein (at least one) each of the pluralities of PUCCH resource units is associated with a number of aggregated carriers.

Example 9 is related to the method of any of examples 2-8, wherein at least one of the pluralities of PUCCH resource units is comprised of consecutive resource units.

Example 1 is related to the method of any of examples 1-9, wherein the PUCCH resource units are of PUCCH format 3.

Example 11 is related to the method of any of examples 2-9, further comprising: receiving (404) uplink information from the wireless device (120) on the selected plurality of PUCCH resource units.

Example 12 is related to a computer program, comprising instructions which, when executed on at least one processor, cause the at least one processor to carry out the method according to any one of examples 1 to 11.

Example 13 is related to a computer-readable storage medium, having stored thereon a computer program, comprising instructions which, when executed on at least one processor, cause the at least one processor to carry out the method according to any one of examples 1 to 11.

Example 14 is related to a method performed by a wireless device (120) for receiving a configuration from a radio node (101), the radio node (101) and the wireless device (120) operating in a wireless communications network (100), the method comprising: receiving (801) a configuration from the radio node (101) with a plurality of Physical Uplink Control Channel, PUCCH, resource units, the plurality of PUCCH resource units being identifiable by an indicator in a single Downlink, DL, scheduling assignment.

Example 15 is related to the method of example 14, wherein the configuration from the radio node (101) comprises a set of pluralities of PUCCH resource units, each of the pluralities of PUCCH resource units being identifiable by a respective indicator in a respective single DL scheduling assignment, the method further comprising: receiving (802) an indication from the radio node (101) with a selected plurality out of the configured set of pluralities of PUCCH resource units for allocation to the wireless device (120), in a DL scheduling assignment.

Example 16 is related to the method of example 15, wherein the receiving (802) comprises receiving the respective indicator from the radio node (101) for the selected plurality, the indicator being comprised in afield of the respective single DL scheduling assignment.

Example 17 is related to the method of any of examples 15-16, wherein the selected plurality has been selected by the radio node (101) based on at least one of: a number of aggregated carriers used for transmission between the radio node (101) and the wireless device (120), a type of carriers used for transmission between the radio node (101) and the wireless device (120), a type of uplink information transmitted by the wireless device (120) from: a Hybrid Automatic Repeat reQuest-ACKnowledgement (HARQ-ACK), a scheduling request (SR) and a periodic Channel State Information (CSI), and a duplex mode used in each of the carriers used for transmission out of: Time Division Duplex and Frequency Division Duplex.

Example 18 is related to the method of any of examples 16-17, wherein each of the pluralities of PUCCH resource units is represented by a single index, each single index corresponding to the respective indicator.

Example 19 is related to the method of any of examples 16-18, wherein the respective single DL scheduling assignment is received over a Physical Downlink Control Channel (PDCCH) or an Enhanced Physical Downlink Control Channel (EPDCCH)

Example 20 is related to the method of any of examples 15-19, wherein each of the pluralities of PUCCH resource units is grouped.

Example 21 is related to the method of any of examples 15-20, wherein at least one of the pluralities of PUCCH resource units is associated with a number of aggregated carriers.

Example 22 is related to the method of any of examples 15-21, wherein at least one of the pluralities of PUCCH resource units is comprised of consecutive resource units.

Example 23 is related to the method of any of examples 14-22, wherein the PUCCH resource units are of PUCCH format 3.

Example 24 is related to the method of any of examples 15-23, further comprising: determining (803) one or more carriers for transmission of UL information on the selected plurality of the PUCCH resource units to the radio node 101.

Example 25 is related to the method of any of examples 15-24, further comprising: determining (804) the selected plurality of the PUCCH resource units, based on the received indication and the received configuration from the radio node 101.

Example 26 is related to the method of any of examples 15-25, further comprising: sending (805) uplink information to the radio node (101) on the selected plurality of PUCCH resource units.

Example 27 is related to the method of any of examples 24, 25 and 26, wherein the sending (805) the UL information to the radio node (101) comprises sending the UL information on the derived plurality of PUCCH resource units, and using the determined one or more carriers.

Example 28 is related to a computer program, comprising instructions which, when executed on at least one processor, cause the at least one processor to carry out the method according to any one of examples 14 to 27.

Example 29 is related to a computer-readable storage medium, having stored thereon a computer program, comprising instructions which, when executed on at least one processor, cause the at least one processor to carry out the method according to any one of examples 14 to 27.

Example 30 is related to a radio node (101) configured to configure a wireless device (120), the radio node (101) and the wireless device (120) being configured to operate in a wireless communications network (100), the radio node (101) being further configured to: configure the wireless device (120) with a plurality of Physical Uplink Control Channel, PUCCH, resource units, the plurality of PUCCH resource units being identifiable by an indicator in a single Downlink, DL, scheduling assignment.

Example 31 is related to the radio node (101) of example 30, wherein to configure comprises to configure the wireless device (120) with a set of pluralities of PUCCH resource units, each of the pluralities of PUCCH resource units being identifiable by a respective indicator in a respective single DL scheduling assignment, the radio node (101) being further configured to: a) select a plurality out of the configured set of pluralities of PUCCH resource units for allocation to the wireless device (120), and b) indicate the selected plurality of PUCCH resource units to the wireless device (120) in a DL scheduling assignment.

Example 32 is related to the radio node (101) of example 31, wherein to indicate comprises to send the respective indicator to the wireless device (120) for the selected plurality of PUCCH resource units, the indicator being comprised in a field of the respective single DL scheduling assignment.

Example 33 is related to the radio node (101) of any of examples 31-32, wherein to select is configured to be based on at least one of: a number of aggregated carriers used for transmission between the radio node (101) and the wireless device (120), a type of carriers used for transmission between the radio node (101) and the wireless device (120), a type of uplink information transmitted by the wireless device (120) from: a Hybrid Automatic Repeat reQuest- ACKnowledgement (HARQ-ACK), a scheduling request (SR) and a periodic Channel State Information (CSI), and a duplex mode used in each of the carriers used for transmission out of: Time Division Duplex and Frequency Division Duplex.

Example 34 is related to the radio node (101) of any of examples 32-33, wherein each of the pluralities of PUCCH resource units is represented by a single index, each single index corresponding to the respective indicator.

Example 35 is related to the radio node (101) of any of examples 32-34, wherein the respective single DL scheduling assignment is configured to be sent over a Physical Downlink Control Channel (PDCCH) or an Enhanced Physical Downlink Control Channel (EPDCCH).

Example 36 is related to the radio node (101) of any of examples 31-35, wherein each of the pluralities of PUCCH resource units is grouped.

Example 37 is related to the radio node (101) of any of examples 31-36, wherein at least one of the pluralities of PUCCH resource units is associated with a number of aggregated carriers.

Example 38 is related to the radio node (101) of any of examples 31-37, wherein at least one of the pluralities of PUCCH resource units is comprised of consecutive resource units.

Example 39 is related to the radio node (101) of any of examples 30-38, wherein the PUCCH resource units are of PUCCH format 3.

Example 40 is related to the radio node (101) of any of examples 31-39, being further configured to: receive uplink information from the wireless device (120) on the selected plurality of PUCCH resource units.

Example 41 is related to a wireless device (120) configured to receive a configuration from a radio node (101), the radio node (101) and the wireless device (120) being configured to operate in a wireless communications network (100), the wireless device (120) being further configured to: receive a configuration from the radio node (101) with a plurality of Physical Uplink Control Channel, PUCCH, resource units, the plurality of PUCCH resource units being identifiable by an indicator in a single Downlink, DL, scheduling assignment.

Example 42 is related to the wireless device (120) of example 41, wherein the configuration from the radio node (101) comprises a set of pluralities of PUCCH resource units, each of the pluralities of PUCCH resource units being identifiable by a respective indicator in a respective single DL scheduling assignment, the wireless device (120) being further configured to: receive an indication from the radio node (101) with a selected plurality out of the configured set of pluralities of PUCCH resource units for allocation to the wireless device (120), in a DL scheduling assignment.

Example 43 is related to the wireless device (120) of example 42, wherein to receive comprises to receive the respective indicator from the radio node (101) for the selected plurality of PUCCH resource units, the indicator being comprised in a field of the respective single DL scheduling assignment.

Example 44 is related to the wireless device (120) of any of examples 42-43, wherein the selected plurality of PUCCH resource units is configured to have been selected by the radio node (101) based on at least one of: a number of aggregated carriers used for transmission between the radio node (101) and the wireless device (120), a type of carriers used for transmission between the radio node (101) and the wireless device (120), a type of uplink information transmitted by the wireless device (120) from: a Hybrid Automatic Repeat reQuest-ACKnowledgement (HARQ-ACK), a scheduling request (SR) and a periodic Channel State Information (CSI), and a duplex mode used in each of the carriers used for transmission out of: Time Division Duplex and Frequency Division Duplex.

Example 45 is related to the wireless device (120) of any of examples 42-44, wherein each of the pluralities of PUCCH resource units is represented by a single index, each single index corresponding to the respective indicator.

Example 46 is related to the wireless device (120) of any of examples 43-45, wherein the respective single DL scheduling assignment is configured to be received over a Physical Downlink Control Channel (PDCCH) or an Enhanced Physical Downlink Control Channel (EPDCCH).

Example 47 is related to the wireless device (120) of any of examples 42-46, wherein each of the pluralities of PUCCH resource units is grouped.

Example 48 is related to the wireless device (120) of any of examples 42-47, wherein at least one of the pluralities of PUCCH resource units is associated with a number of aggregated carriers.

Example 49 is related to the wireless device (120) of any of examples 42-48, wherein at least one of the pluralities of PUCCH resource units is comprised of consecutive resource units.

Example 50 is related to the wireless device (120) of any of examples 41-49, wherein the PUCCH resource units are of PUCCH format 3.

Example 51 is related to the wireless device (120) of any of examples 42-50, being further configured to: determine one or more carriers for transmission of UL information on the selected plurality of the PUCCH resource units to the radio node 101.

Example 52 is related to the wireless device (120) of any of examples 42-51, being further configured to: determine the selected plurality of the PUCCH resource units, based on the received indication and the received configuration from the radio node 101.

Example 53 is related to the wireless device (120) of any of examples 42-52, being further configured to: send uplink information to the radio node (101) on the selected plurality of PUCCH resource units.

Example 54 is related to the wireless device (120) of any of examples 51, 52 and 53, wherein to send the UL information to the radio node (101) comprises to send the UL information on the derived plurality of PUCCH resource units, and using the determined one or more carriers.

The invention claimed is:

1. A method, performed by a radio node, for configuring a wireless device, the radio node and the wireless device operating in a wireless communications network, the method comprising:
  configuring the wireless device with a plurality of Physical Uplink Control Channel (PUCCH) resource units, wherein the plurality of PUCCH resource units is associated with a number of downlink (DL) aggregated carriers;
  wherein the configuring of the wireless device comprises configuring the wireless device with a set of pluralities of PUCCH resource units, each of the pluralities of PUCCH resource units in the set being identifiable by a respective indicator in a respective single DL scheduling assignment;
  selecting a plurality of PUCCH resource units out of the configured set of pluralities of PUCCH resource units for allocation to the wireless device; and indicating the selected plurality of PUCCH resource units to the wireless device in a DL scheduling assignment.

2. The method of claim 1, wherein at least one of:
for at least some of the aggregated carriers in the number of downlink aggregated carriers, each aggregated carrier is allocated a different PUCCH resource unit within the plurality of PUCCH resource units, wherein each PUCCH resource unit is identifiable by a respective indicator in a respective single DL scheduling assignment; and
each aggregated carrier in the number of downlink aggregated carriers is allocated the plurality of PUCCH resource units as a group, wherein the plurality of PUCCH resource units is identifiable by a single indicator in a respective single DL scheduling assignment.

3. The method of claim 1, wherein the indicating comprises sending the respective indicator to the wireless device for the selected plurality of PUCCH resource units, the indicator being comprised in a field of the respective single DL scheduling assignment.

4. The method of claim 3, wherein the field is one of:
a Transmission Control Protocol (TCP) field;
a field comprising first and second sections, wherein the first section indicates an Uplink (UL) component carrier which carries the selected plurality of PUCCH resource units, and the second section indicates the PUCCH resource offset with respect to a first PUCCH resource unit within the UL component carrier;
a Downlink Control Information (DCI) field which indicates the selected plurality of PUCCH resource units together with a serving cell index information.

5. The method of claim 1, wherein the selecting is based on at least one of:
a number of aggregated carriers used for transmission between the radio node and the wireless device DL, Uplink (UL), or both;
a type of carriers used for transmission between the radio node and the wireless device DL, UL, or both;
a type of uplink information transmitted by the wireless device from:
a Hybrid Automatic Repeat reQuest-ACKnowledgement (HARQ-ACK);
a scheduling request (SR); and
a periodic Channel State Information (CSI); and
a duplex mode used in each of the carriers used for transmission out of: a Time Division Duplex mode and a Frequency Division Duplex mode.

6. The method of claim 1, wherein each of the pluralities of PUCCH resource units is represented by a single index, each single index corresponding to the respective indicator.

7. The method of claim 1, wherein the respective single DL scheduling assignment is sent over a Physical Downlink Control Channel (PDCCH) or an Enhanced Physical Downlink Control Channel (EPDCCH).

8. The method of claim 1, wherein each of the pluralities of PUCCH resource units is grouped.

9. The method of claim 1, wherein at least one of the pluralities of PUCCH resource units is associated with the number of DL aggregated carriers.

10. The method of claim 1, wherein at least one of the pluralities of PUCCH resource units is mapped to consecutive resource units.

11. The method of claim 1, further comprising receiving uplink information from the wireless device on the selected plurality of PUCCH resource units.

12. The method of claim 1, wherein the PUCCH resource units are of PUCCH format 3.

13. A computer program product stored in a non-transitory computer readable medium for controlling a radio node in configuring a wireless device, the radio node and the wireless device operating in a wireless communications network, the computer program product comprising software instructions which, when run on one or more processors of the radio node, causes the radio node to:
configure the wireless device with a plurality of Physical Uplink Control Channel (PUCCH) resource units, wherein the plurality of PUCCH resource units is associated with a number of downlink (DL) aggregated carriers;
wherein to configure the wireless device comprises to configure the wireless device with a set of pluralities of PUCCH resource units, each of the pluralities of PUCCH resource units in the set being identifiable by a respective indicator in a respective single DL scheduling assignment;
select a plurality of PUCCH resource units out of the configured set of pluralities of PUCCH resource units for allocation to the wireless device; and
indicate the selected plurality of PUCCH resource units to the wireless device in a DL scheduling assignment.

14. A method, performed by a wireless device, for receiving a configuration from a radio node, the radio node and the wireless device operating in a wireless communications network, the method comprising:
receiving a configuration from the radio node with a plurality of Physical Uplink Control Channel (PUCCH) resource units, wherein the plurality of PUCCH resource units are associated with a number of downlink aggregated carriers;
wherein the received configuration from the radio node comprises a set of pluralities of PUCCH resource units, each of the pluralities of PUCCH resource units being identifiable by a respective indicator in a respective single DL scheduling assignment;
receiving an indication from the radio node with a selected plurality out of the configured set of pluralities of PUCCH resource units for allocation to the wireless device, in a DL scheduling assignment; and
configuring uplink communications for the wireless device according to the received indication.

15. The method of claim 14, wherein at least one of:
for at least some of the aggregated carriers in the number of downlink aggregated carriers, each aggregated carrier is allocated a different PUCCH resource unit within the plurality of PUCCH resource units, wherein each PUCCH resource unit is identifiable by a respective indicator in a respective single Downlink (DL) scheduling assignment, and
each aggregated carrier in the number of downlink aggregated carriers is allocated the plurality of PUCCH resource units as a group, wherein the plurality of PUCCH resource units is identifiable by a single indicator in a respective single DL scheduling assignment.

16. The method of claim 14, wherein the receiving the indication comprises receiving the respective indicator from the radio node for the selected plurality, the indicator being comprised in a field of the respective single DL scheduling assignment.

17. The method of claim 16, wherein the field is one of:
a Transmission Control Protocol (TCP) field;
a field comprising first and second sections, wherein the first section indicates an Uplink (UL) component carrier which carries the selected plurality of PUCCH resource units, and the second section indicates the PUCCH resource offset with respect to the first PUCCH resource unit within the UL component carrier;
a Downlink Control Information (DCI) field which indicates the selected plurality of PUCCH resource units together with the serving cell index information.

18. The method of claim 14, wherein the selected plurality has been selected by the radio node based on at least one of:
a number of aggregated carriers used for transmission between the radio node and the wireless device DL, uplink (UL), or both;
a type of carriers used for transmission between the radio node and the wireless device DL, UL, or both;
a type of uplink information transmitted by the wireless device from:
a Hybrid Automatic Repeat reQuest-ACKnowledgement (HARQ-ACK);
a scheduling request (SR); and
a periodic Channel State Information (CSI); and
a duplex mode used in each of the carriers used for transmission out of: a Time Division Duplex mode and a Frequency Division Duplex mode.

19. The method of claim 14, wherein each of the pluralities of PUCCH resource units is represented by a single index, each single index corresponding to the respective indicator.

20. The method of claim 14, wherein the respective single DL scheduling assignment is received over a Physical Downlink Control Channel (PDCCH) or an Enhanced Physical Downlink Control Channel (EPDCCH).

21. The method of claim 14, wherein each of the pluralities of PUCCH resource units is grouped.

22. The method of claim 14, wherein at least one of the pluralities of PUCCH resource units is associated with the number of DL aggregated carriers.

23. The method of claim 14, wherein at least one of the pluralities of PUCCH resource units is mapped to consecutive resource units.

24. The method of claim 14, further comprising determining one or more carriers for transmission of uplink (UL) information on the selected plurality of the PUCCH resource units to the radio node.

25. The method of claim 14, further comprising determining the selected plurality of the PUCCH resource units based on the received indication and the received configuration from the radio node.

26. The method of claim 14, further comprising sending uplink (UL) information to the radio node on the selected plurality of PUCCH resource units.

27. The method of claim 26, wherein the sending the UL information to the radio node comprises sending the UL information on the derived plurality of PUCCH resource units, and using the determined one or more carriers.

28. The method of claim 14, wherein the PUCCH resource units are of PUCCH format 3.

29. A computer program product stored in a non-transitory computer readable medium for controlling a wireless device for receiving a configuration from a radio node, the radio node and the wireless device operating in a wireless communications network, the computer program product comprising software instructions which, when run on one or more processors of the wireless device, causes the wireless device to:
receive a configuration from the radio node with a plurality of Physical Uplink Control Channel (PUCCH) resource units, wherein the plurality of PUCCH resource units are associated with a number of downlink aggregated carriers;
wherein the received configuration from the radio node comprises a set of pluralities of PUCCH resource units, each of the pluralities of PUCCH resource units being identifiable by a respective indicator in a respective single DL scheduling assignment;
receive an indication from the radio node with a selected plurality out of the configured set of pluralities of PUCCH resource units for allocation to the wireless device, in a DL scheduling assignment; and
configure uplink communications for the wireless device according to the received indication.

30. A radio node configured to configure a wireless device, the radio node and the wireless device being configured to operate in a wireless communications network, the radio node comprising:
a processing circuit;
memory containing instructions executable by the processing circuit whereby the radio node is operative to:
configure the wireless device with a plurality of Physical Uplink Control Channel (PUCCH) resource units, wherein the plurality of PUCCH resource units is associated with a number of downlink aggregated carriers;
wherein to configure the wireless device comprises to configure the wireless device with a set of pluralities of PUCCH resource units, each of the pluralities of PUCCH resource units being identifiable by a respective indicator in a respective single DL scheduling assignment;
select a plurality out of the configured set of pluralities of PUCCH resource units for allocation to the wireless device; and
indicate the selected plurality of PUCCH resource units to the wireless device in a DL scheduling assignment.

31. The method of claim 30, wherein at least one of:
for at least some of the aggregated carriers in the number of downlink aggregated carriers, each aggregated carrier is configured to be allocated a different PUCCH resource unit within the plurality of PUCCH resource units, wherein each PUCCH resource unit is identifiable by a respective indicator in a respective single Downlink (DL) scheduling assignment; and
each aggregated carrier in the number of downlink aggregated carriers is configured to be allocated the plurality of PUCCH resource units as a group, wherein the plurality of PUCCH resource units is identifiable by a single indicator in a respective single DL scheduling assignment.

32. The radio node of claim 30, wherein the radio node is configured to indicate the selected plurality of PUCCH resource units to the wireless device in a DL scheduling assignment by sending the respective indicator to the wireless device for the selected plurality of PUCCH resource units, the indicator being comprised in a field of the respective single DL scheduling assignment.

33. The radio node of claim 32, wherein the field is one of:
a Transmission Control Protocol (TCP) field;
a field comprising first and second sections, wherein the first section indicates an Uplink (UL) component carrier which carries the selected plurality of PUCCH resource units, and the second section indicates the PUCCH resource offset with respect to the first PUCCH resource unit within the UL component carrier;
a Downlink Control Information (DCI) field which indicates the selected plurality of PUCCH resource units together with the serving cell index information.

34. The radio node of claim 30, wherein the radio node is configured to select the plurality out of the configured set of pluralities of PUCCH resource units for allocation to the wireless device based on at least one of:
a number of aggregated carriers used for transmission between the radio node and the wireless device DL, Uplink (UL), or both;
a type of carriers used for transmission between the radio node and the wireless device DL, UL, or both;
a type of uplink information transmitted by the wireless device from:
a Hybrid Automatic Repeat reQuest-ACKnowledgement (HARQ-ACK);
a scheduling request (SR); and
a periodic Channel State Information (CSI); and
a duplex mode used in each of the carriers used for transmission out of: a Time Division Duplex mode and a Frequency Division Duplex mode.

35. The radio node of claim 30, wherein each of the pluralities of PUCCH resource units is represented by a single index, each single index corresponding to the respective indicator.

36. The radio node of claim 30, wherein the respective single DL scheduling assignment is configured to be sent over a Physical Downlink Control Channel (PDCCH) or an Enhanced Physical Downlink Control Channel (EPDCCH).

37. The radio node of claim 30, wherein each of the pluralities of PUCCH resource units is grouped.

38. The radio node of claim 30, wherein at least one of the pluralities of PUCCH resource units is associated with the number of DL aggregated carriers.

39. The radio node of claim 30, wherein at least one of the pluralities of PUCCH resource units is mapped to consecutive resource units.

40. The radio node of claim 30, wherein the radio node is further configured to receive uplink information from the wireless device on the selected plurality of PUCCH resource units.

41. The radio node of claim 30, wherein the PUCCH resource units are of PUCCH format 3.

42. A wireless device configured to receive a configuration from a radio node, the radio node and the wireless device being configured to operate in a wireless communications network, the wireless device comprising
a processing circuit;
memory containing instructions executable by the processing circuit whereby the wireless device is operative to:
receive a configuration from the radio node with a plurality of Physical Uplink Control Channel (PUCCH) resource units, wherein the plurality of PUCCH resource units is associated with a number of downlink aggregated carriers;
wherein the configuration from the radio node comprises a set of pluralities of PUCCH resource units, each of the pluralities of PUCCH resource units being identifiable by a respective indicator in a respective single DL scheduling assignment;
receive an indication from the radio node with a selected plurality out of the configured set of pluralities of PUCCH resource units for allocation to the wireless device, in a DL scheduling assignment; and
configure uplink communications for the wireless device according to the received indication.

43. The wireless device of claim 42, wherein at least one of:
for at least some of the aggregated carriers in the number of downlink aggregated carriers, each aggregated carrier is configured to be allocated a different PUCCH resource unit within the plurality of PUCCH resource units, wherein each PUCCH resource unit is identifiable by a respective indicator in a respective single Downlink (DL) scheduling assignment; and
each aggregated carrier in the number of downlink aggregated carriers is configured to be allocated the plurality of PUCCH resource units as a group, wherein the plurality of PUCCH resource units is identifiable by a single indicator in a respective single DL scheduling assignment.

44. The wireless device of claim 42, wherein the wireless device is configured to receive the respective indicator from the radio node for the selected plurality of PUCCH resource units, the indicator being comprised in a field of the respective single DL scheduling assignment.

45. The method of claim 44, wherein the field is one of:
a Transmission Control Protocol (TCP) field;
a field comprising first and second sections, wherein the first section indicates an Uplink (UL) component carrier which carries the selected plurality of PUCCH resource units, and the second section indicates the PUCCH resource offset with respect to the first PUCCH resource unit within the UL component carrier;
a Downlink Control Information (DCI) field which indicates the selected plurality of PUCCH resource units together with the serving cell index information.

46. The wireless device of claim 42, wherein the selected plurality of PUCCH resource units is configured to have been selected by the radio node based on at least one of:
a number of aggregated carriers used for transmission between the radio node and the wireless device DL, uplink (UL), or both;
a type of carriers used for transmission between the radio node and the wireless device DL, UL, or both,
a type of uplink information transmitted by the wireless device from:
a Hybrid Automatic Repeat reQuest-ACKnowledgement (HARQ-ACK);
a scheduling request (SR); and
a periodic Channel State Information (CSI); and
a duplex mode used in each of the carriers used for transmission out of: a Time Division Duplex mode and a Frequency Division Duplex mode.

47. The wireless device of claim 42, wherein each of the pluralities of PUCCH resource units is represented by a single index, each single index corresponding to the respective indicator.

48. The wireless device of claim 42, wherein the wireless device is configured to receive the respective single DL scheduling assignment over a Physical Downlink Control Channel (PDCCH) or an Enhanced Physical Downlink Control Channel (EPDCCH).

49. The wireless device of claim 42, wherein each of the pluralities of PUCCH resource units is grouped.

50. The wireless device of claim 42, wherein at least one of the pluralities of PUCCH resource units is associated with the number of DL aggregated carriers.

51. The wireless device of claim 42, wherein at least one of the pluralities of PUCCH resource units is mapped to consecutive resource units.

52. The wireless device of claim 42, wherein the wireless device is further configured to determine one or more carriers for transmission of uplink (UL) information on the selected plurality of the PUCCH resource units to the radio node.

53. The wireless device of claim 42, wherein the wireless device is further configured to determine the selected plurality of the PUCCH resource units based on the received indication and the received configuration from the radio node.

54. The wireless device of claim 42, wherein the wireless device is further configured to send uplink (UL) information to the radio node on the selected plurality of PUCCH resource units.

55. The wireless device of claim 54, wherein the wireless device is configured to send the UL information to the radio node on the derived plurality of PUCCH resource units, and using the determined one or more carriers.

56. The wireless device of claim 42, wherein the PUCCH resource units are of PUCCH format 3.

* * * * *

UNITED STATES PATENT AND TRADEMARK OFFICE
CERTIFICATE OF CORRECTION

PATENT NO. : 10,027,539 B2
APPLICATION NO. : 14/914028
DATED : July 17, 2018
INVENTOR(S) : Song et al.

Page 1 of 2

It is certified that error appears in the above-identified patent and that said Letters Patent is hereby corrected as shown below:

In the Drawings

Figure 4:
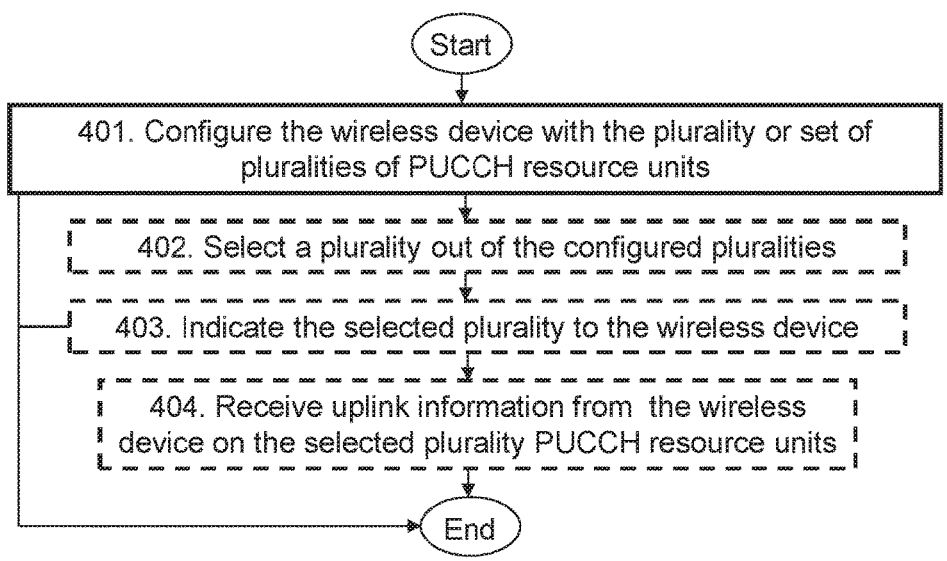
FIG. 4 is a schematic diagram illustrating embodiments of a method in a radio node, according to some embodiments.

In Fig. 4, Sheet 3 of 8, in Action "404", Line 2, delete "plurality PUCCH" and insert -- plurality of PUCCH --, therefor.

In the Specification

In Column 3, Line 57, delete "LTE" and insert -- LTE Rel-8, --, therefor.

In Column 7, Line 62, delete "equipped" and insert -- equipment --, therefor.

In Column 10, Line 40, delete "lager" and insert -- larger --, therefor.

In Column 10, Line 59, delete "they may" and insert -- there may --, therefor.

In Column 11, Line 35, delete "Y)}" and insert -- Y} --, therefor.

In Column 12, Line 54, delete "preceded" and insert -- precoded --, therefor.

In Column 16, Line 13, delete "101;" and insert -- 101: --, therefor.

In Column 16, Line 41, delete "carriers." and insert -- carriers, --, therefor.

In Column 19, Line 61, delete "may received." and insert -- may be received. --, therefor.

In Column 22, Line 48, delete "that the any" and insert -- that any --, therefor.

In Column 25, Line 44, delete "that the any" and insert -- that any --, therefor.

In Column 27, Line 37, delete "afield" and insert -- a field --, therefor.

Signed and Sealed this
Twenty-fifth Day of June, 2019

Andrei Iancu
*Director of the United States Patent and Trademark Office*

In the Claims

In Column 34, Line 40, in Claim 31, delete "method" and insert -- radio node --, therefor.

In Column 36, Line 25, in Claim 45, delete "method" and insert -- wireless device --, therefor.